(12) United States Patent
Inada et al.

(10) Patent No.: US 8,728,591 B2
(45) Date of Patent: May 20, 2014

(54) POLYMER FILM, PHASE DIFFERENCE FILM, POLARIZING PLATE, LIQUID CRYSTAL DISPLAY DEVICE, RETARDATION INDUCING AGENT, AND MEROCYANINE-BASED COMPOUND

(75) Inventors: Hiroshi Inada, Minami-ashigara (JP); Ryo Nakamura, Minami-ashigara (JP); Masaki Noro, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/528,606

(22) Filed: Jun. 20, 2012

(65) Prior Publication Data

US 2012/0329974 A1    Dec. 27, 2012

(30) Foreign Application Priority Data

Jun. 23, 2011  (JP) ................. 2011-139125

(51) Int. Cl.
*C09K 19/00* (2006.01)

(52) U.S. Cl.
USPC ............ 428/1.31; 430/96; 524/205; 524/206; 524/209

(58) Field of Classification Search
USPC ........... 430/507, 512, 627, 628, 631, 931, 96; 428/1.31; 524/205, 206, 209
See application file for complete search history.

(56) References Cited

U.S. PATENT DOCUMENTS

| | | | | |
|---|---|---|---|---|
| 4,045,229 A | * | 8/1977 | Weber et al. | 430/512 |
| 4,591,886 A | * | 5/1986 | Umeda et al. | 347/235 |
| 4,946,768 A | * | 8/1990 | Vallarino | 430/512 |
| 5,248,990 A | * | 9/1993 | Ishikawa et al. | 347/262 |
| 5,806,834 A | | 9/1998 | Yoshida | |
| 5,858,272 A | * | 1/1999 | Haseba et al. | 252/299.61 |
| 8,178,601 B2 | | 5/2012 | Fukagawa et al. | |
| 2009/0080074 A1 | | 3/2009 | Fukagawa et al. | |
| 2010/0009067 A1 | * | 1/2010 | Inoue et al. | 427/66 |
| 2010/0060831 A1 | * | 3/2010 | Futamura et al. | 349/97 |
| 2010/0130638 A1 | | 5/2010 | Hanaki et al. | |
| 2010/0209366 A1 | * | 8/2010 | Kluijtmans et al. | 424/59 |
| 2011/0057155 A1 | | 3/2011 | Furuwaka et al. | |

FOREIGN PATENT DOCUMENTS

| | | |
|---|---|---|
| JP | 8-239509 A | 9/1996 |
| JP | 2009-64006 A | 3/2009 |
| JP | 2009-64007 A | 3/2009 |
| JP | 2009-67973 A | 4/2009 |
| JP | 2009-67983 A | 4/2009 |
| JP | 2009-79213 A | 4/2009 |
| JP | 2009-270062 A | 11/2009 |

* cited by examiner

*Primary Examiner* — Robert Jones, Jr.
(74) *Attorney, Agent, or Firm* — Birch, Stewart, Kolasch & Birch, LLP

(57) ABSTRACT

Disclosed is a polymer film excellent in performance of inducing Rth. The polymer film comprises at least one species of a compound represented by the formula (I) and a compound represented by the formula (I'):

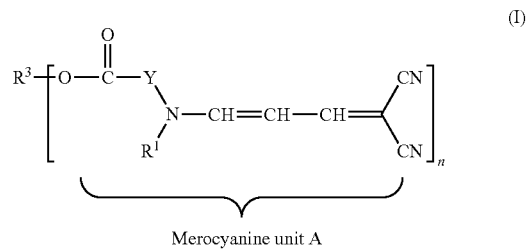

(I)

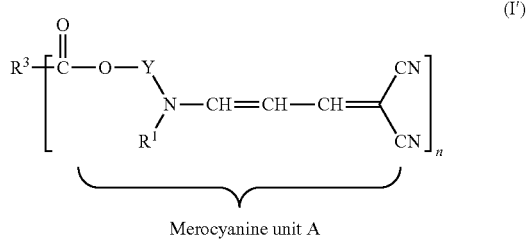

(I')

15 Claims, 1 Drawing Sheet

POLYMER FILM, PHASE DIFFERENCE FILM, POLARIZING PLATE, LIQUID CRYSTAL DISPLAY DEVICE, RETARDATION INDUCING AGENT, AND MEROCYANINE-BASED COMPOUND

CROSS-REFERENCE TO RELATED APPLICATIONS

The present application claims the benefit of priority from Japanese Patent Application No. 139125/2011, filed on Jun. 23, 2011, the contents of which are herein incorporated by reference in their entirety.

BACKGROUND OF THE INVENTION

1. Field of the Invention

The present invention relates to a polymer film exhibiting high retardation along thickness direction (Rth); a phase difference film, a polarizing plate, and a liquid crystal display device using the polymer film; and an Rth inducing agent.

2. Description of the Related Art

There have been known techniques of adding various additives to a polymer film, aiming at imparting thereto various functions.

An exemplary proposal has been made on a polymer film improved in ultraviolet absorption, by means of addition of a merocyanine-based compound, as a ultraviolet absorber, to the polymer film (i.e., JP-A-H08-239509). JP-A-2009-67973 discloses a polymer material containing a merocyanine-based compound as an ultraviolet absorber, a mold product manufactured by using the polymer material, and also a coated ultraviolet absorber layer. Other proposals have been made on use of a merocyanine-based compound as a wavelength dispersion modifier for polymer film (i.e., JP-A-2009-64006 and JP-A-2009-64007). JP-A-2009-270062, JP-A-2009-79213 and JP-A-2009-67983 have proposed techniques of using a merocyanine-based ultraviolet absorber combined with other types of ultraviolet absorber, aiming at improving the light stability.

Polymer film typically used as an optically compensatory film of liquid crystal display device is sometimes required to show high Rth. Increase in the amount of addition of the additive, aimed at elevating Rth, have however occasionally degraded the stability of manufacturing, due to deposition of the additive onto the surface of the film in the process of film making. In the field of manufacturing of polymer film typically adoptable to optical films, it is therefore very beneficial to provide an additive capable of ensuring high Rth even with a less amount of addition, while ensuring a desired level of wavelength dispersion.

SUMMARY OF THE INVENTION

It is therefore an object of the present invention to provide a polymer film exhibiting high Rth; and a phase difference film, a polarizing plate, and a liquid crystal display device using the polymer film.

It is another object of the present invention to provide an Rth inducing agent capable of ensuring high Rth even with a small amount of addition, while ensuring a desired level of wavelength dispersion, and is excellent in performance of inducing Rth; and a novel merocyanine-based compound versatile for various applications including Rth inducing agent for polymer film.

The means to be solved by the present invention are as follows:

<1> A polymer film comprising at least one species of a compound represented by the formula (I) and a compound represented by the formula (I'):

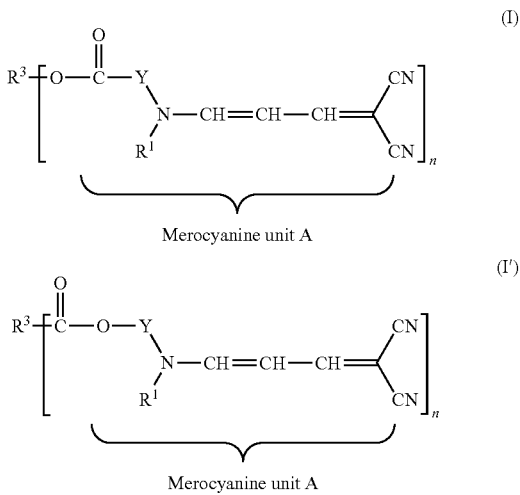

in the formulae (I) and (I'), $R^1$ represents a $C_{1-6}$ unsubstituted alkyl group or $C_{6-12}$ unsubstituted aryl group; Y represents a $C_{1-6}$ substituted or unsubstituted alkylene group, or substituted or unsubstituted arylene group, where, given that Y represents a substituted or unsubstituted alkylene group, if possible, one carbon atom, or two or more non-adjacent carbon atoms in the alkylene group may be substituted by oxygen atom(s); n represents an integer of 1 to 3, and for n=1, $R^3$ represents a substituted or unsubstituted alkyl group, or a substituted or unsubstituted aryl group, where, if possible, one carbon atom, or two or more non-adjacent carbon atoms in the substituted or unsubstituted alkyl group may be substituted by oxygen atom(s), and for n=2 to 3, $R^3$ represents an n-valent linking group composed of one or more atoms; and for n=2 or larger, n merocyanine units A may be same or different.

<2> The polymer film according to <1>, wherein the compound represented by the formula (I) is a compound represented by the formula (II) below:

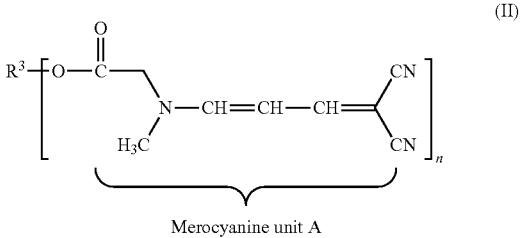

where, definitions of $R^3$ and n in the formula (II) are same as those in the formula (I).

<3> The polymer film according to <1>, wherein the compound represented by the formula (I') is a compound represented by the formula (II') below:

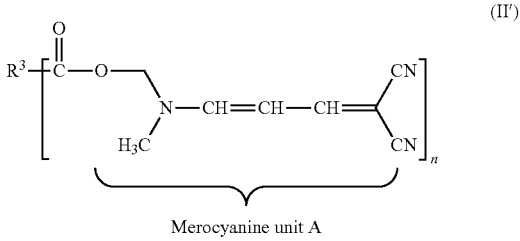

where, definitions of $R^3$ and n in the formula (II') are same as those in the formula (I').

<4> The polymer film according to <1>, configured as (i) or (ii) below:

(i) n=1, and $R^3$ represents a substituted or unsubstituted alkyl group (where, if possible, one carbon atom, or two or more non-adjacent carbon atoms in the alkyl group may be substituted by oxygen atom(s)); or (ii) n=2 to 3, and $R^3$ represents a linking group composed of a substituted or unsubstituted alkylene group (where, if possible, one carbon atom, or two or more non-adjacent carbon atoms in the alkylene group may be substituted by oxygen atom(s)), substituted or unsubstituted arylene group, or a combination of them.

<5> The polymer film according to <2>, configured as (i) or (ii) below:

(i) n=1, and $R^3$ represents a substituted or unsubstituted alkyl group (where, if possible, one carbon atom, or two or more non-adjacent carbon atoms in the alkyl group may be substituted by oxygen atom(s)); or (ii) n=2 to 3, and $R^3$ represents a linking group composed of a substituted or unsubstituted alkylene group (where, if possible, one carbon atom, or two or more non-adjacent carbon atoms in the alkylene group may be substituted by oxygen atom(s)), substituted or unsubstituted arylene group, or a combination of them.

<6> The polymer film according to <3>, configured as (i) or (ii) below:

(i) n=1, and $R^3$ represents a substituted or unsubstituted alkyl group (where, if possible, one carbon atom, or two or more non-adjacent carbon atoms in the alkyl group may be substituted by oxygen atom(s)); or (ii) n=2 to 3, and $R^3$ represents a linking group composed of a substituted or unsubstituted alkylene group (where, if possible, one carbon atom, or two or more non-adjacent carbon atoms in the alkylene group may be substituted by oxygen atom(s)), substituted or unsubstituted arylene group, or a combination of them.

<7> The polymer film according to <1>, which comprises a polymer selected from cellulose-based polymer, polycarbonate-based polymer, polyester-based polymer, acrylic polymer, and styrene-based polymer as the main ingredient.

<8> The polymer film according to <2>, which comprises a polymer selected from cellulose-based polymer, polycarbonate-based polymer, polyester-based polymer, acrylic polymer, and styrene-based polymer as the main ingredient.

<9> The polymer film according to <3>, which comprises a polymer selected from cellulose-based polymer, polycarbonate-based polymer, polyester-based polymer, acrylic polymer, and styrene-based polymer as the main ingredient.

<10> The polymer film according to <4>, which comprises a polymer selected from cellulose-based polymer, polycarbonate-based polymer, polyester-based polymer, acrylic polymer, and styrene-based polymer as the main ingredient.

<11> The polymer film according to <7>, wherein the amount of addition of the compound represented by the formula (I) and/or the compound represented by the formula (I') is 0.3 to 10 parts by mass relative to the polymer.

<12> The polymer film according to <8>, wherein the amount of addition of the compound represented by the formula (I) and/or the compound represented by the formula (I') is 0.3 to 10 parts by mass relative to the polymer.

<13> The polymer film according to <9>, wherein the amount of addition of the compound represented by the formula (I) and/or the compound represented by the formula (I') is 0.3 to 10 parts by mass relative to the polymer.

<14> The polymer film according to <10>, wherein the amount of addition of the compound represented by the formula (I) and/or the compound represented by the formula (I') is 0.3 to 10 parts by mass relative to the polymer.

<15> A phase difference film comprising the polymer film described in any one of <1> to <14>, and an optically anisotropic layer configured by curing a liquid crystal composition.

<16> A polarizing plate comprising the polymer film described in any one of <1> to <14> or the phase difference film described in <15>, and a polarizing film.

<17> A liquid crystal display device comprising the polymer film described in any one of <1> to <14>.

<18> An Rth inducing agent comprising at least one species of a compound represented by the formula (I) and a compound represented by the formula (I'):

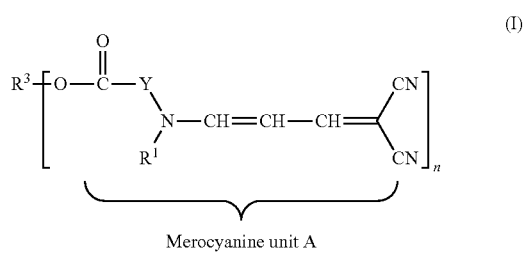

Merocyanine unit A

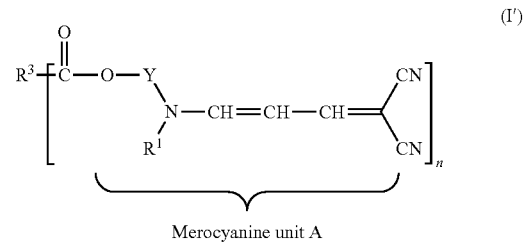

Merocyanine unit A in the formulae (I) and (I'), $R^1$ represents a $C_{1-6}$ unsubstituted alkyl group or $C_{6-12}$ unsubstituted aryl group; Y represents a $C_{1-6}$ substituted or unsubstituted alkylene group, or substituted or unsubstituted arylene group, where, given that Y represents a substituted or unsubstituted alkylene group, if possible, one carbon atom, or two or more non-adjacent carbon atoms in the alkylene group may be substituted by oxygen atom(s); n represents an integer of 1 to 3, and for n=1, $R^3$ represents a substituted or unsubstituted alkyl group, or a substituted or unsubstituted aryl group, where, if possible, one carbon atom, or two or more non-adjacent carbon atoms in the substituted or unsubstituted alkyl group may be substituted by oxygen atom(s), and for n=2 to 3, $R^3$ represents an n-valent linking group composed of one or more atoms; and for n=2 or larger, n merocyanine units A may be same or different.

<19> A merocyanine-based compound represented by at least either one of formula (II) and formula (II') below:

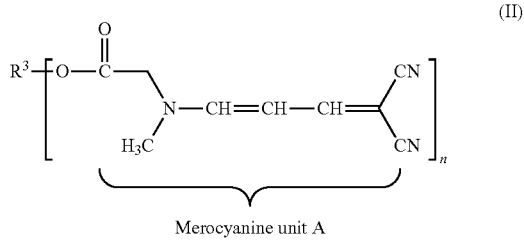

Merocyanine unit A

-continued

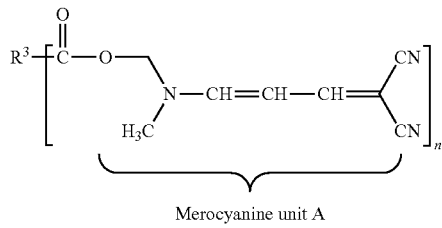

Merocyanine unit A in the formulae (II) and (II'), n represents an integer of 1 to 3, and for n=1, $R^3$ represents a hydrogen atom, substituted or unsubstituted alkyl group, or substituted or unsubstituted aryl group, where, if possible, one carbon atom, or two or more non-adjacent carbon atoms in the substituted or unsubstituted alkyl group may be substituted by oxygen atom(s), and for n=2 to 3, $R^3$ represents an n-valent linking group composed of one or more atoms; and for n=2 or larger, n merocyanine units A may be same or different.

<20> The merocyanine-based compound according to <19>, configured as (i) or (ii) below:

(i) n=1, and $R^3$ represents a substituted or unsubstituted alkyl group (where, if possible, one carbon atom, or two or more non-adjacent carbon atoms in the alkyl group may be substituted by oxygen atom(s)); or (ii) n=2 to 3, and $R^3$ represents a linking group composed of a substituted or unsubstituted alkylene group (where, if possible, one carbon atom, or two or more non-adjacent carbon atoms in the alkylene group may be substituted by oxygen atom(s)), substituted or unsubstituted arylene group, or a combination of them.

The present invention successfully provides a polymer film exhibiting high Rth; and a phase difference film, a polarizing plate, and a liquid crystal display device using the polymer film.

The present invention also successfully provides an Rth inducing agent excellent in performance of inducing Rth even with a small amount of addition, and a novel merocyanine-based compound versatile for various applications including Rth inducing agent.

Figure 1:
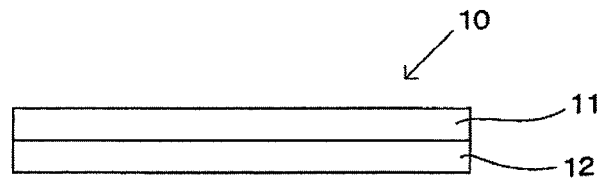
FIG. 1 is a schematic cross sectional view illustrating one embodiment of a phase difference film of the present invention.

In the drawings, the meanings of the reference numerals are as follows:

10 Retardation Film
11 Optically Anisotropic Layer
12 Support (polymer film of the invention)
13 Polarizing Film
14 Protective Film
15 Polarizing Plate
16 Liquid-Crystal Cell
17 TN-Mode Liquid-Crystal Display Device

BEST MODES FOR CARRYING OUT THE INVENTION

The invention is described in detail hereinunder. In this description, the numerical range expressed by the wording "a number to another number" means the range that falls between the former number indicating the lowermost limit of the range and the latter number indicating the uppermost limit thereof.

1. Polymer Film

The present invention relates to a polymer film which includes at least one species of a compound represented by the formula (I) below and a compound represented by the formula (I') below:

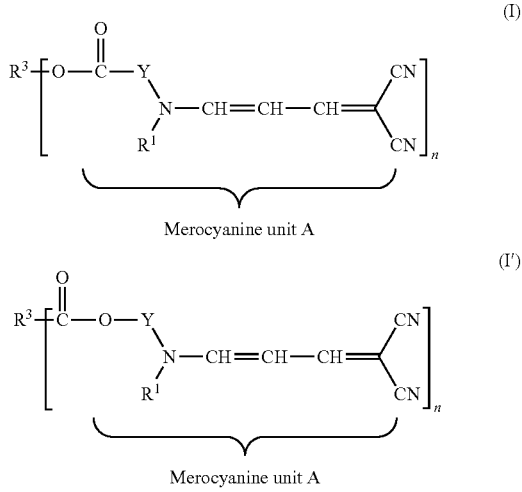

In the formulae (I) and (I'), $R^1$ represents a $C_{1-6}$ unsubstituted alkyl group or a $C_{6-12}$ unsubstituted aryl group; Y represents a $C_{1-6}$ substituted or unsubstituted alkylene group, or substituted or unsubstituted arylene group, where, given that Y represents a substituted or unsubstituted alkylene group, if possible, one carbon atom, or two or more non-adjacent carbon atoms in the alkylene group may be substituted by oxygen atom(s); n represents an integer of 1 to 3, and for n=1, $R^3$ represents a substituted or unsubstituted alkyl group, or a substituted or unsubstituted aryl group, where, if possible, one carbon atom, or two or more non-adjacent carbon atoms in the substituted or unsubstituted alkyl group may be substituted by oxygen atom(s), and for n=2 to 3, $R^3$ represents an n-valent linking group composed of one or more atoms; and for n=2 or larger, n merocyanine units A may be same or different.

The merocyanine-based compound represented by the formula (I) or (I') characteristically exhibits a performance of inducing high Rth even with a small amount of addition, while ensuring a desired level of wavelength dispersion. The polymer film containing the merocyanine-based compound can exhibit high Rth. Since the compound may ensure high Rth even with a small amount of addition, so that the amount of addition may be reduced, and thereby the additive becomes less likely to deposit on the surface of the film in the process of film making. In particular, since the compound has a hydrophilic group, it exhibits high affinity with hydrophilic polymers (i.e., cellulose acylate), and may therefore be more effectively suppressed from vaporizing out from the film in the process of film making. Accordingly, the compound is particularly useful as an additive of a polymer film which contains a hydrophilic polymer as a major constituent.

While detailed mechanism by which the compound exhibits an excellent performance of inducing Rth remains unclear, it is supposed that the substituent groups $R^1$ and —Y—(C=O)—O—$R^3$ (or —Y—O—(C=O)—$R^3$) in the amine portion are different groups (preferably groups having different chain length) and are asymmetrical to each other, so that the whole shape of molecule becomes more rod-like, and this consequently improves the alignability of molecules in the polymer film, and improves the performance of inducing Rth.

In the formulae (I) and (I'), $R^1$ represents a $C_{1-6}$ unsubstituted alkyl group or a $C_{6-12}$ unsubstituted aryl group.

For the case where $R^1$ represents an unsubstituted alkyl group, it preferably has 1 to 6 carbon atoms, more preferably has 1 to 4 carbon atoms, and is particularly preferably a methyl group (having one carbon atom). The alkyl group may be configured by a straight chain or branched chain, or by a ring.

For the case where $R^1$ represents an unsubstituted aryl group, it preferably has 6 to 12 carbon atoms, and more specifically, it is preferably a phenyl group or naphthyl group, and is more preferably a phenyl group.

Y represents a $C_{1-6}$ substituted or unsubstituted alkylene group, or substituted or unsubstituted arylene group (i.e., phenylene group). Y is preferably a $C_{1-6}$ substituted or unsubstituted alkylene group, preferably has 1 to 2 carbon atoms, and more preferably has one carbon atom. One carbon atom, or two or more non-adjacent carbon atoms in the alkylene group may be substituted by oxygen atom(s).

Y may have one or more substituent groups, wherein examples of the substituent group include halogen atom (i.e., fluorine atom, chlorine atom, bromine atom, iodine atom), aryl group (i.e., phenyl, naphthyl), cyano group, carboxyl group, alkoxycarbonyl group (i.e., methoxycarbonyl), aryloxycarbonyl group (i.e., phenoxycarbonyl), substituted or unsubstituted carbamoyl group (i.e., carbamoyl, N-phenylcarbamoyl, N,N-dimethylcarbamoyl), alkylcarbonyl group (i.e., acetyl), arylcarbonyl group (i.e., benzoyl), nitro group, substituted or unsubstituted amino group (i.e., amino, dimethylamino, anilino), acylamino group (i.e., acetamide, ethoxycarbonylamino), sulfonamide group (i.e., methane sulfonamide), imide group (i.e., succinimide, phthalimide), imino group (i.e., benzylideneamino), hydroxy group, alkoxy group (i.e., methoxy), aryloxy group (i.e., phenoxy), acyloxy group (i.e., acetoxy), alkylsulfonyloxy group (i.e., methanesulfonyloxy), arylsulfonyloxy group (i.e., benzenesulfonyloxy), sulfo group, substituted or unsubstituted sulfamoyl group (i.e., sulfamoyl, N-phenylsulfamoyl), alkylthio group (i.e., methylthio), arylthio group (i.e., phenylthio), alkylsulfonyl group (i.e., methanesulfonyl), arylsulfonyl group (i.e., benzenesulfonyl), and heterocyclic group (i.e., pyridyl, morpholino). The substituent group may further be substituted, and a plurality of substituent groups in this case may be same or different. The substituent groups may bind to each other to form a ring.

n represents an integer of 1 to 3, and is preferably 1 or 2.

For n=1, $R^3$ represents a hydrogen atom, substituted or unsubstituted alkyl group, or substituted or unsubstituted aryl group, and if possible, one carbon atom, or two or more non-adjacent carbon atoms in the substituted or unsubstituted alkyl group may be substituted by oxygen atom(s).

For n=1, the substituted or unsubstituted alkyl group represented by $R^3$ preferably has 1 to 25 carbon atoms, more preferably has 1 to 20 carbon atoms, and particularly preferably has 1 to 15 carbon atoms. The alkyl group may be configured by a straight chain or branched chain. One carbon atom, or two or more non-adjacent carbon atoms in the substituted or unsubstituted alkyl group may be substituted by oxygen atom(s). In other words, the substituted or unsubstituted alkyl group represented by $R^3$ may contain one or more (preferably 1 to 4) polyoxyalkylene chain(s) (i.e., oxyethylene group, oxypropylene group). The alkyl group represented by $R^3$ may have one or more substituent groups. Examples of the substituent group are same as those of the substituent group represented by $R^1$ in the formula (I). Among others, the substituted alkyl group is preferably an alkyl group substituted by an aryl group (i.e., substituted or unsubstituted phenyl group).

For n=1, the substituted or unsubstituted aryl group represented by $R^3$ preferably has 6 to 12 carbon atoms, and more specifically, it is preferably a phenyl group or naphthyl group, and is particularly preferably a phenyl group. The aryl group represented by $R^3$ may have one or more substituent groups. Examples of the substituent group are same as those of the substituent group represented by Y in the formulae (I) and (I').

For n=2 to 3, $R^3$ represents an n-valent linking group composed of one or more atoms. Examples of the divalent group include substituted or unsubstituted alkylene group [where, if possible, one carbon atom, or two or more non-adjacent carbon atoms in the alkylene group may be substituted by oxygen atom(s), that is, one or more (preferably 1 to 4) polyoxyalkylene chain(s) (i.e., oxyethylene group, oxypropylene group) may be contained], substituted or unsubstituted arylene group, or a linking group configured by any combination of them. Examples of the substituted or unsubstituted alkylene group, and the substituted or unsubstituted arylene group are same as those represented by Y in the formulae (I) and (I'). The linking group configured by any combination of substituted or unsubstituted alkylene group, and the substituted or unsubstituted arylene group, is exemplified by groups represented by the formula (B) below, but not limited thereto:

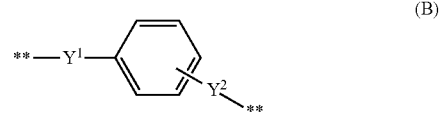

(B)

In the formula, each ** represents a position where the group binds with merocyanine unit A, each of $Y^1$ and $Y^2$ represents a $C_{1-6}$ substituted or unsubstituted alkylene group, where one or more carbon atoms, or two or more two or more non-adjacent carbon atoms may be substituted by oxygen atom(s).

Preferable examples of the compound represented by the formula (I) include compounds represented by the formula (II) below:

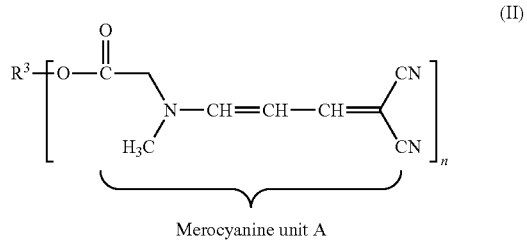

(II)

Merocyanine unit A

In the formula (II), n represents an integer of 1 to 3, and for n=1, $R^3$ represents a hydrogen atom, substituted or unsubstituted alkyl group, or substituted or unsubstituted aryl group, where, if possible, one carbon atom, or two or more non-adjacent carbon atoms in the substituted or unsubstituted alkyl group may be substituted by oxygen atom(s), and for n=2 to 3, $R^3$ represents an n-valent linking group composed of one or more atoms; for n=2 or larger, n merocyanine units A may be same or different.

Preferable ranges of n and $R^3$ in the formula (II) are same as those of n and $R^3$ in the formula (I).

Preferable examples of the compound represented by the formula (I') include a compound represented by the formula (II') below:

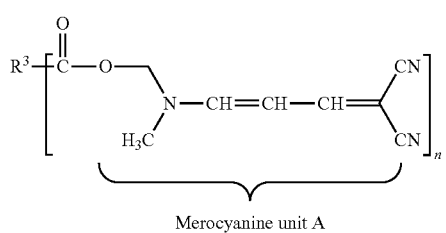

Merocyanine unit A

In the formula (II'), n represents an integer of 1 to 3, for n=1, $R^3$ represents a hydrogen atom, substituted or unsubstituted alkyl group, or substituted or unsubstituted aryl group, where, if possible, one carbon atom, or two or more non-adjacent carbon atoms in the substituted or unsubstituted alkyl group may be substituted by oxygen atom(s), and for n=2 to 3, $R^3$ represents an n-valent linking group composed of one or more atoms; for n=2 or larger, n merocyanine units A may be same or different.

Preferable ranges of n and $R^3$ in the formula (II') are same as those of n and $R^3$ in the formula (I').

Specific examples of the compound represented by the formula (I) and the compound represented by the formula (I') will be shown below, without limiting the compounds applicable to the present invention.

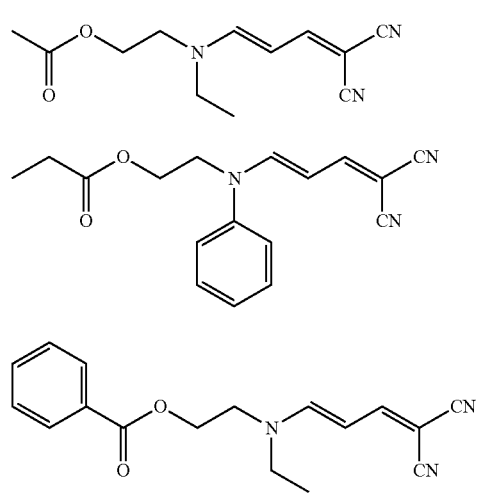

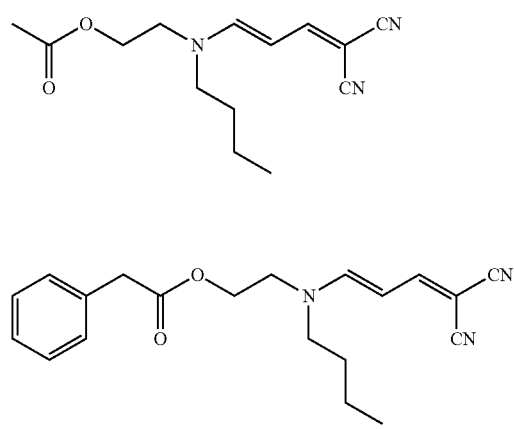

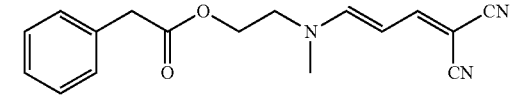

-continued
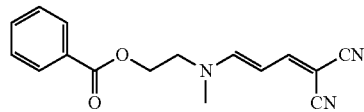
15
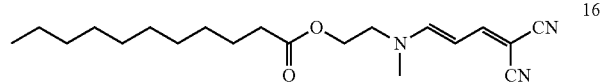
16
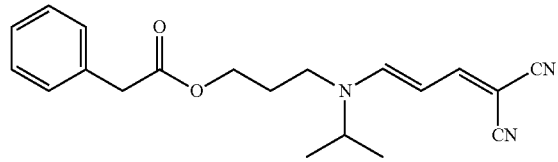
17
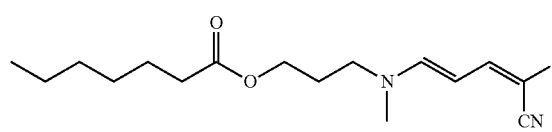
18
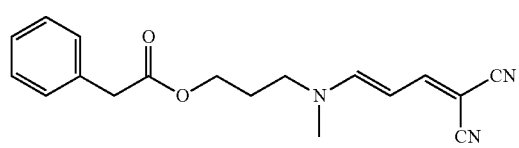
19
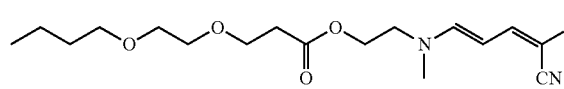
20
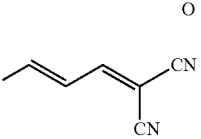
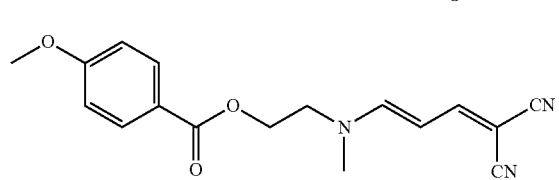
21
22
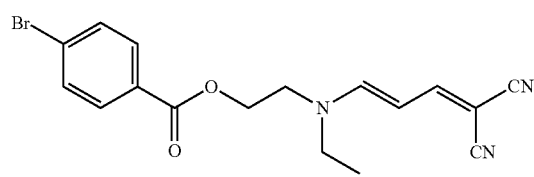
23
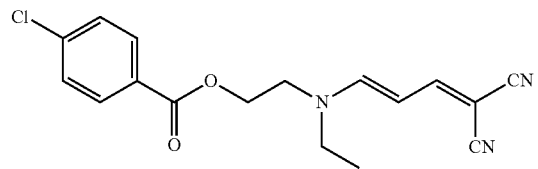
24
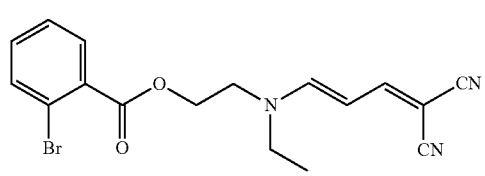
25
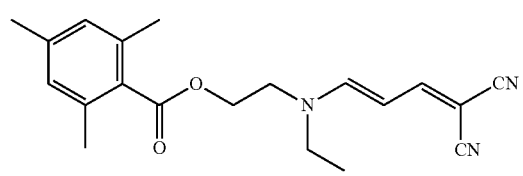
26
27
28
29
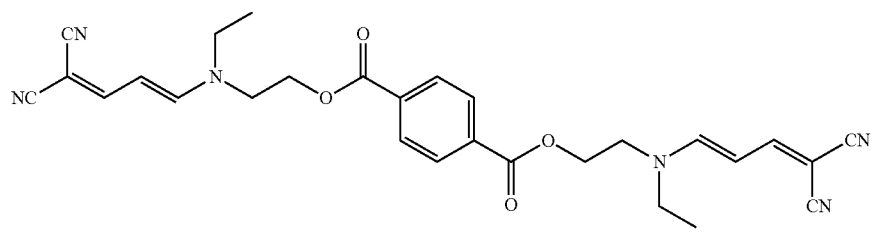
30
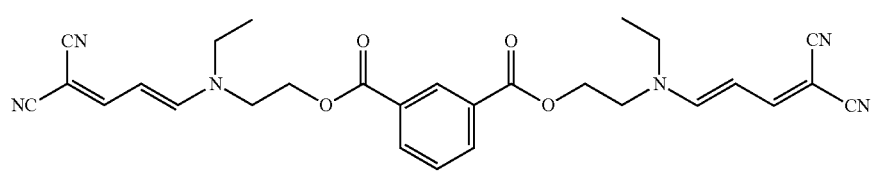
31

-continued
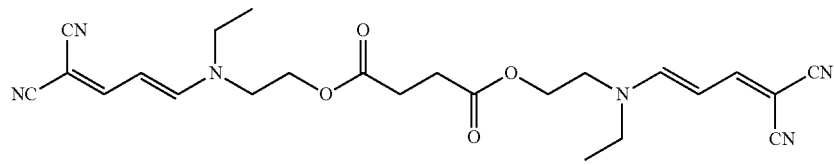
32
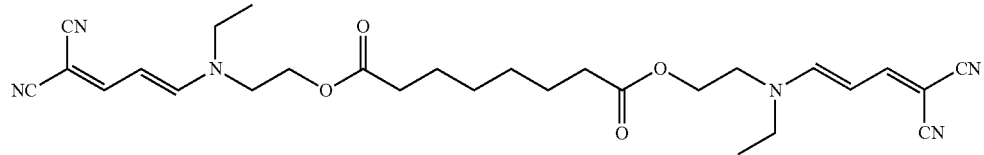
33
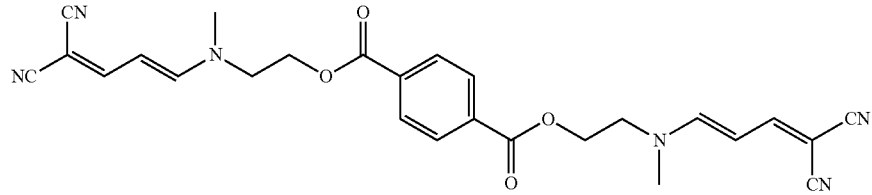
34
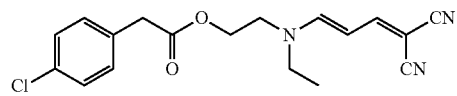
35
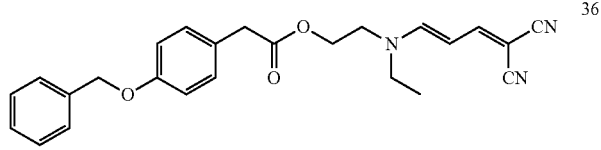
36
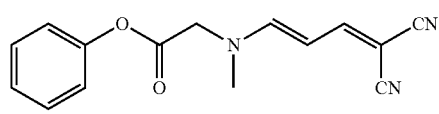
37
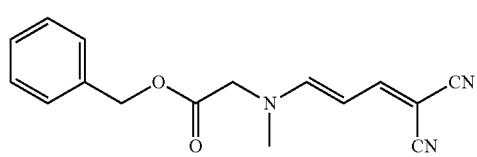
38
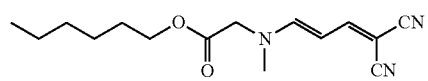
39
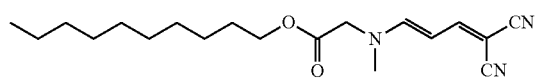
40
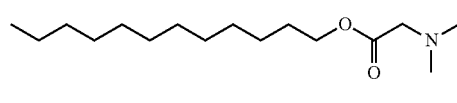
41
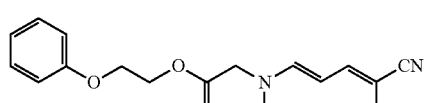
42
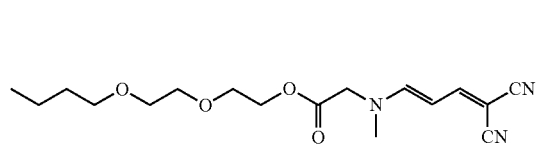
43
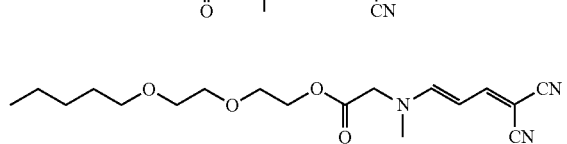
44
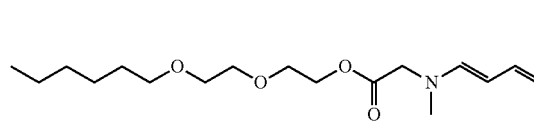
45
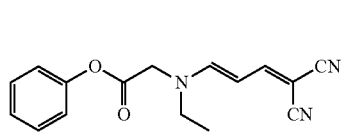
46
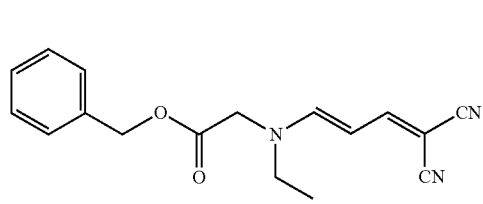
47
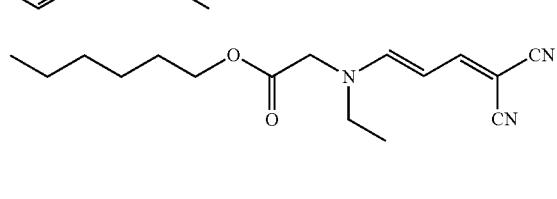
48

-continued
| 49 | 50 |
|---|---|
| 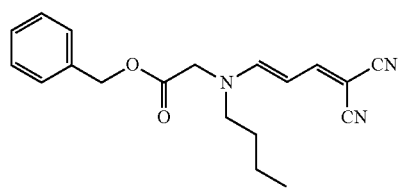 | 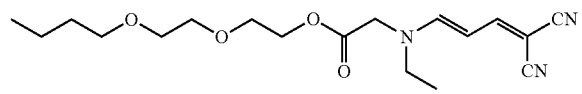 |
| 51 | 52 |
| 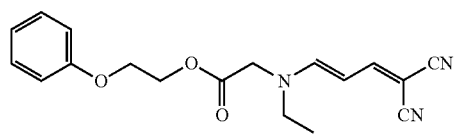 | 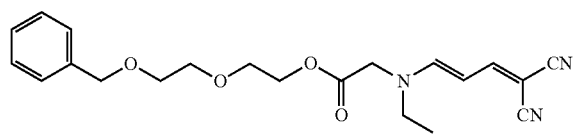 |
| 53 | 54 |
| 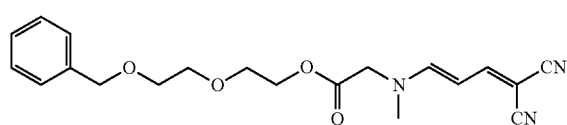 | 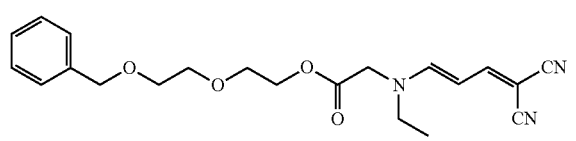 |
55
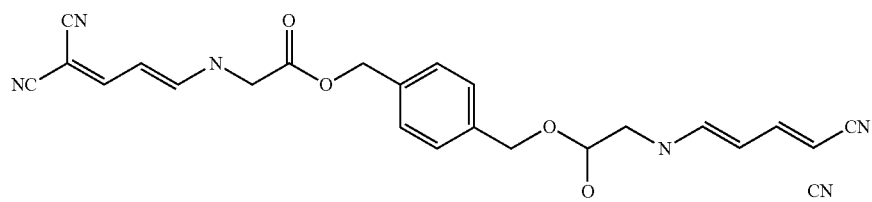
56
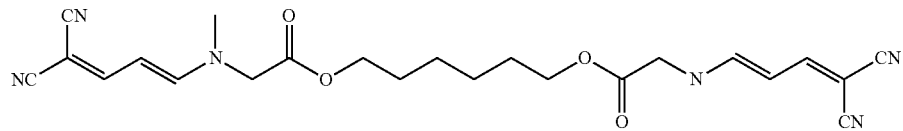
57
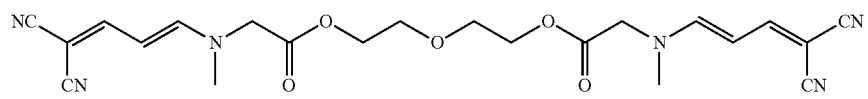
58
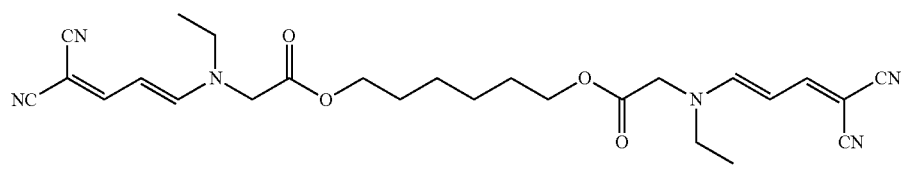
59
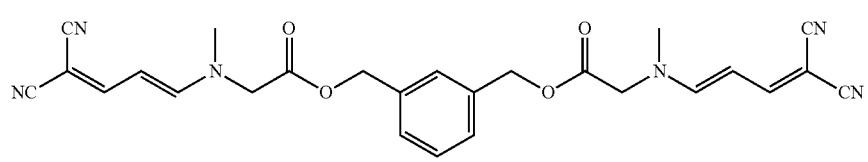
60
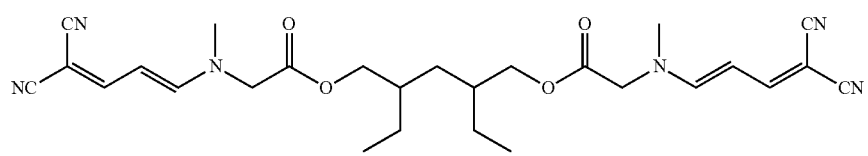
| 61 | 62 |
|---|---|
| 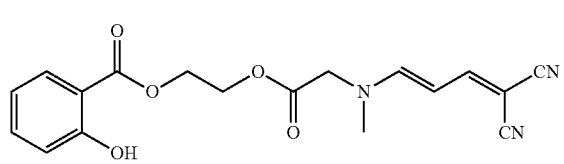 | 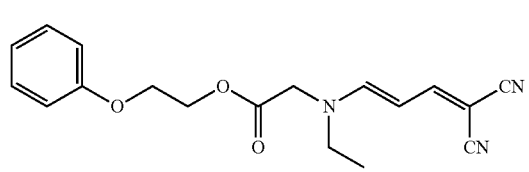 |

-continued

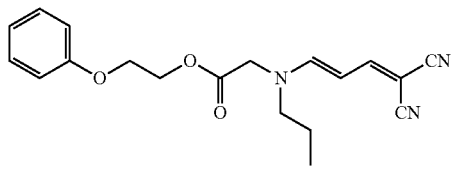
63

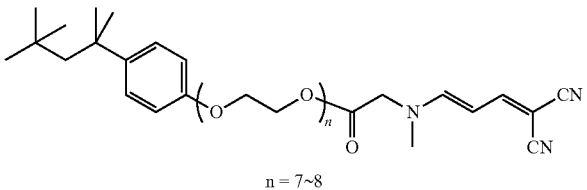
64 n = 7~8

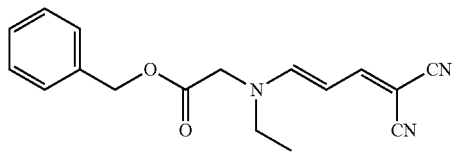
65

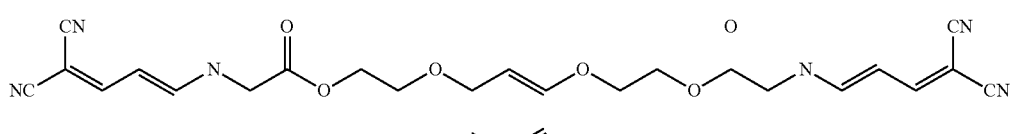
66

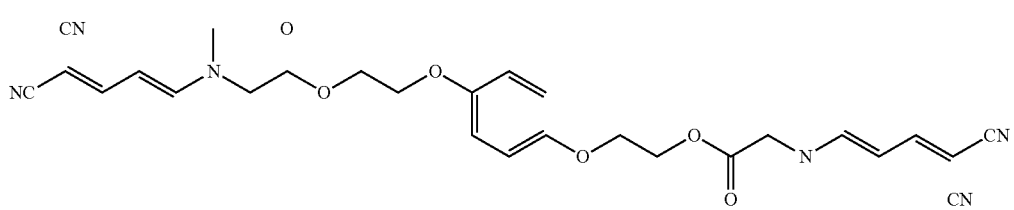
67

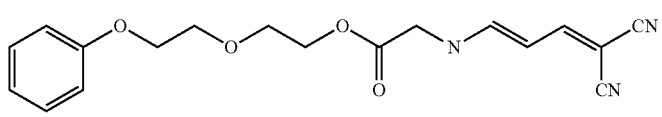
68

The compounds represented by the formula (I) and the compounds represented by the formula (I') may be synthesized by a variety of methods, without special limitation. For example, a compound represented by the formula (III) may be synthesized by a method according to the scheme below:

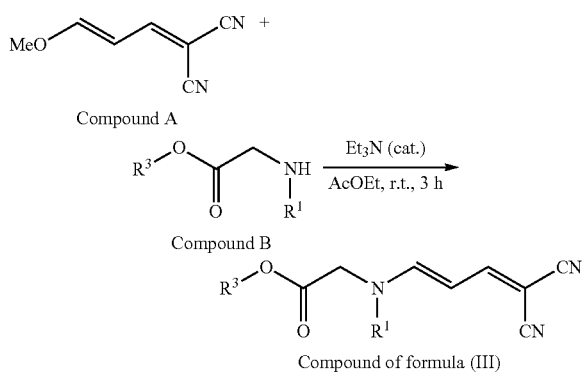

Compound A and Compound B may be commercially available, or may be synthesized according to any known method of synthesis. Compound A may be synthesized according to a method typically disclosed in U.S. Pat. No. 3,950,160, and Compound B may be synthesized by a method typically disclosed in Synthetic Communications, 1997, 27, p. 2539-2546. Various compounds represented by the formula (III) may be synthesized, by appropriately selecting Compound B used as a reagent, depending on structure of the final product. Also a dimer and larger multimers may be synthesized by appropriately selecting a dimer of Compound B.

While triethylamine is used as a catalyst in the scheme shown in the above, also pyridine, 1,8-diazabicyclo[5.4.0]undec-7-ene (DBU), 1,5-diazabicyclo[4.3.0]non-5-ene (DBN) or the like may be used as the catalyst, in place of triethylamine, or together with triethylamine. While ethyl acetate is used as an organic solvent in the scheme shown in the above, also acetonitrile, toluene, acetone, chloroform, dichloromethane or the like may be used, in place of ethyl acetate, or together with ethyl acetate.

Reaction temperature is not specifically limited, wherein temperature under which the reaction can proceed will suffice, and the temperature is not higher than boiling point of the solvent. For example, the reaction may be proceeded at room temperature (20 to 30° C. or around). Also reaction time is not specifically limited, and may be 1 to 12 hours for example.

The polymer film of the present invention may contain only either one of the compound represented by the formula (I) and the compound represented by the formula (I'), or may contain two or more species. Rth of the polymer film elevates as the amount of addition of the compound represented by the formula (I) and/or the compound represented by the formula (I') increases, but this also enhances a depositional tendency of the compound(s) onto the surface of the film. From these points of view, the amount of addition of the compound(s) is preferably 0.3 to 10 parts by mass relative to the polymer, and more preferably 0.5 to 6 parts by mass.

Each of the compound represented by the formula (I) and the compound represented by the formula (I') preferably has a molecular weight of 200 or larger, more preferably 250 or larger, and particularly preferably 290 or larger.

Polymer as the main ingredient, composing the polymer film of the present invention is not specifically limited, and any polymer is adoptable so long as it may be given in the form of film by solution casting, melt casting or the like. Examples of the polymer adoptable to the present invention include cellulose-based polymer such as cellulose triacetate, polycarbonate-based polymer, polyester-based polymer such as polyethylene terephthalate and polyethylene naphthalate, acrylic polymer such as polymethyl methacrylate, and styrene-based polymer such as polystyrene and acrylonitrile-styrene copolymer (AS resin). Other examples include poly-olefin such as polyethylene and polypropylene, polyolefin-based polymer such as ethylene-propylene copolymer, vinyl chloride-based polymer, amide-based polymer such as nylon and aromatic polyamide, imide-based polymer, sulfone-based polymer, polyethersulfone-based polymer, polyether ether ketone-based polymer, polyphenylene sulfide-based polymer, vinylidene chloride-based polymer, vinyl alcohol-based polymer, vinyl butyral-based polymer, arylate-based polymer, polyoxymethylene-based polymer, epoxy-based polymer, and any polymer mixed with the above-described polymer(s).

Since the compound represented by the formula (I) and the compound represented by the formula (I') have hydrophilic groups and thereby exhibit high affinity with hydrophilic polymers, so that they are highly effective when they are combined with hydrophilic polymers. From this point of view, the major constituent polymer is preferably a hydrophilic polymer, and more specifically, cellulose-based polymer, polyester-based polymer, and polyimide-based polymer are preferable.

The polymer film of the present invention may be manufactured typically by solvent casting, melt casting or the like, without special limitation on the method of manufacturing.

The polymer film of the present invention may contain other additives besides the compound represented by the formula (I) and/or the compound represented by the formula (I'), so long as the effects of the present invention will not be impaired. The polymer film may also contain plasticizer, anti-degradation agent (i.e., antioxidant, peroxide decomposing agent, radical inhibitor, metal deactivator, acid scavenger, amine), and organic and/or inorganic particle.

For the purpose of accelerating vaporization of the solvent and reducing the residual solvent content, the polymer film may also contain, as the plasticizer, an oligomer having aromatic groups. By periodically introducing the aromatic groups into a part of repeating units of the oligomer, alignability of molecules of the oligomer after annealing may be improved in an effective manner. The aromatic group-containing oligomer is preferably a polycondensed ester containing at least one species of dicarboxylic acid residue, and at least one species of diol residue. While the aromatic group may be contained in the dicarboxylic acid residue or in the diol residue, it is most preferable to use the polycondensed ester having the aromatic group in the dicarboxylic acid residue. More specifically, the aromatic group-containing oligomer is preferably selected from polycondensed esters containing at least one species of aromatic dicarboxylic acid residue, and at least one species of aliphatic diol residue.

The polymer film of the present invention may be subjected to stretching and/or thermal shrinkage, aiming at modifying optical characteristics. Stretching and thermal shrinkage may be implemented in all directions. If the film is continuously manufactured, they may be implemented in the longitudinal direction, or in the widthwise direction orthogonal to the longitudinal direction.

The polymer film of the present invention may be subjected to surface treatment such as glow discharge treatment, ultraviolet irradiation, corona treatment, flame treatment, saponification (acid saponification, alkali saponification) or the like, aiming at improving adhesiveness to other layers.

Since the polymer film of the present invention exhibits normal wavelength dispersion characteristics of Rth (larger Rth at shorter wavelength), so that it exhibits desirable properties when adopted to optical films of liquid crystal display device (i.e., optically compensatory film, and protective film of polarizing plate), and other specific applications.

The polymer film of the present invention is also useful for applications besides those described later, including protective film of various component, insect repellent film, film for solar battery module, and architectural film.

2. Retardation Film:

The invention relates to a retardation film comprising the polymer film of the invention and, as formed thereon, an optically anisotropic layer formed of a liquid-crystal composition. The retardation film of the invention is useful for optical compensation in liquid-crystal display devices, especially in TN-mode liquid-crystal display devices.

FIG. 1 shows a schematic cross-sectional view of one embodiment of the retardation film of the invention. The retardation film 10 in FIG. 1 comprises an optically anisotropic layer 11 formed of a liquid-crystal composition, and a polymer film 12 of the invention to support the layer 11. Between the optically anisotropic layer 11 and the polymer film 12, an alignment film for controlling the alignment of liquid-crystal molecules may be arranged in forming the optically anisotropic layer 11 formed of a liquid-crystal composition. FIG. 1 is a schematic view, and therefore the relative thickness of the constitutive layers does not always reflect the relative thickness of the layers in an actual optical compensatory film. The same shall apply to FIG. 2 and FIG. 3 to be given below.

2-(1) Support (Polymer Film of the Invention):

In the retardation film of the invention, the polymer film of the invention is used as the support for the optically anisotropic layer to be described below. In an embodiment where the retardation film is used for optical compensation in TN-mode liquid-crystal display devices, preferred is use of a polymer film which satisfies the above formulae (3) and (4) and of which Re is from 60 to 100 nm and Rth is from 40 to 80 nm.

2-(2) Optically Anisotropic Layer:

The retardation film of the invention has at least one optically anisotropic layer formed of a liquid-crystal composition. Optionally, the film may have two or more such layers. In an embodiment where the retardation film is used for optical compensation in TN-mode liquid-crystal display devices, preferably, the optically anisotropic layer has the characteristics that its Re(550) is from 20 to 100 nm, it has no direction in which its Re(550) is 0 nm, and the direction in which the absolute value of its Re(550) is the smallest is neither in the normal direction of the layer nor the in-plane direction. One example of the optically anisotropic layer having such characteristics is an optically anisotropic layer formed by fixing a liquid-crystal composition in a hybrid alignment state. Especially preferred is an optically anisotropic layer formed by fixing a liquid-crystal composition containing a discotic compound in a hybrid alignment state. More preferably, Re(550) of the optically anisotropic layer is from 20 to 40 nm.

The liquid-crystal composition for use in forming the optically anisotropic layer is preferably a liquid-crystal composition capable of forming a nematic phase and a smectic phase. Liquid-crystal compounds are generally divided into rod-shaped liquid-crystal compounds and discotic liquid-crystal compounds based on the shape of their molecules; and in the invention, liquid-crystal compounds of any form are employable.

Discotic Liquid-Crystal Compound:

As the discotic liquid-crystal compound for use in forming the optically anisotropic layer, preferred are the compounds of the general formula (D1) described in detail in JP-A 2006-76992, paragraph [0012] and later. Concretely, preferred for use in the invention are the compounds described in JP-A 2006-76992, paragraph [0052], and in JP-A 2007-2220, paragraphs [0040] to [0063]. These compounds are preferred as exhibiting high birefringence. Of the compounds of the formula (DI), those exhibiting discotic liquid-crystallinity are preferred, and those exhibiting discotic-nematic phase are more preferred.

Preferred examples of the discotic compounds include those described in JP-A 2005-301206.

Rod-Shaped Liquid-Crystal Compound:

Rod-shaped liquid-crystal compounds are usable as the material for the optically anisotropic layer.

Use of least two different types of rod-shaped liquid-crystal compounds is preferred for satisfying the necessary properties of the optically anisotropic layer. One preferred combination is a combination of at least one rod-shaped liquid-crystal compound of the following general formula (X) and at least one rod-shaped liquid-crystal compound of the following general formula (XI):

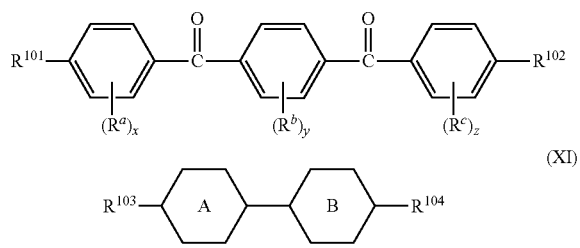

In the formulae, A and B each represent a group of an aromatic or aliphatic hydrocarbon ring or a hetero ring; $R^{101}$ to $R^{104}$ each represent a substituted or unsubstituted, $C_{1-12}$ (preferably $C_{3-7}$) alkylene chain-containing alkoxy, acyloxy, alkoxycarbonyl or alkoxycarbonyloxy group; $R^a$, $R^b$ and $R^c$ each represent a substituent; x, y and z each indicate an integer of from 1 to 4.

In the formulae, the alkylene chain contained in $R^{101}$ to $R^{104}$ may be linear or branched. Preferably, the chain is linear. For curing the composition, preferably, $R^{101}$ to $R^{104}$ have a polymerizing group at the terminal thereof. Examples of the polymerizing group include an acryloyl group, a methacryloyl group, an epoxy group, etc.

In the formula (X), preferably, x and z are 0 and y is 1. Preferably, one $R^b$ is a meta- or ortho-positioned substituent relative to the oxycarbonyl group or the acyloxy group. Preferably, $R^b$ is a $C_{1-12}$ alkyl group (e.g., methyl group), a halogen atom (e.g., fluorine atom), etc.

In the formula (XI), preferably, A and B each are a phenylene group or a cyclohexylene group. Preferably, both of A and B are phenylene groups, or one of them is a cyclohexylene group and the other is a phenylene group.

Method for Formation of Optically Anisotropic Layer:

Preferably, the optically anisotropic layer is formed by applying a composition containing at least one liquid-crystal compound to the surface of the polymer film of the invention or to the surface of an alignment film formed on the polymer film, then aligning the liquid-crystal compound molecules in a desired alignment state, and curing the composition through polymerization to thereby fix the alignment state. In order that the optically anisotropic layer satisfies the characteristics that it does not have a direction in which its Re(550) is 0 nm and the direction in which the absolute value of its Re(550) is the smallest is neither in the normal direction of the layer nor in the in-plane direction, preferably, the liquid-crystal compound molecules (including both rod-shaped and discotic molecules) are fixed in a hybrid alignment state. Hybrid alignment means that the direction of the director of the liquid-crystal molecules continuously changes in the thickness direction of the layer. For rod-shaped molecules, the director is the long axis direction; and for discotic molecules, the director is the normal line direction to the discotic face.

In order to make the liquid-crystal compounds aligned in a desired alignment state, and for the purpose of bettering the coatability and the curability of the composition, the composition may contain at least one additive.

For hybrid alignment of the molecules of liquid-crystal compound (especially rod-shaped liquid-crystal compound), an additive capable of controlling the alignment on the air interface side of the layer may be added to the composition (hereinafter the additive is referred to as "air-interface alignment controlling agent"). The additive includes low-molecular or high-molecular compounds having a hydrophilic group such as a fluoroalkyl group, a sulfonyl group, etc. Specific examples of the air-interface alignment controlling agent usable here include the compounds described in JP-A 2006-267171.

In case where a coating liquid of the composition is prepared and the optically anisotropic layer is formed in a mode of coating with the liquid, a surfactant may be added to the liquid for bettering the coatability. The surfactant is preferably a fluorine-containing compound, including, for example, the compounds described in JP-A 2001-330725, paragraphs [0028] to [0056]. A commercial product, "Megafac F780" (by Dai-Nippon Ink) is also usable.

And the composition preferably contains at least one polymerization initiator. The polymerization initiator may be selected from thermal or photo-polymerization initiators. In terms of ease of controlling, photo-polymerization initiators are preferable. Examples of the photo-polymerization initiator, which is capable of generating radicals under irradiation with light, include alpha-carbonyl compounds (described in U.S. Pat. Nos. 2,367,661 and 2,367,670), acyloin ether (described in U.S. Pat. No. 2,448,828), alpha-hydrocarbon-substituted aromatic acyloin compounds (described in U.S. Pat. No. 2,722,512), polynuclearquinone compounds (described in U.S. Pat. Nos. 3,046,127 and 2,951,758), combinations of triarylimidazole dimers and p-aminophenyl ketones (described in U.S. Pat. No. 3,549,367), acridine and phenadine compounds (described in JPA No. sho 60-105667 and U.S. Pat. No. 4,239,850), oxadiazole compounds (described in U.S. Pat. No. 4,212,970), acetophenone type compounds, benzoin ether type compounds, benzyl type compounds, benzophenone type compounds, and thioxanthone type compounds. Examples of the acetophenone compound include, for example, 2,2-diethoxyacetophenone, 2-hydroxymethyl-1-phenylpropan-1-one, 4'-isopropyl-2-hydroxy-2-methylpropiophenone, 2-hydroxy-2-methyl-propiophenone, p-dimethylaminoacetone, p-tert-butyldichloroacetophenone, p-tert-butyltrichloroacetophenone, p-azidobenzalacetophenone. Examples of the benzyl compound include, for example, benzyl, benzyl dimethyl ketal, benzyl β-methoxyethyl acetal, 1-hydroxycyclohexyl phenyl ketone. The benzoin ether compounds include, for example, benzoin, benzoin methyl ether, benzoin ethyl ether, benzoin n-propyl ether, benzoin isopropyl ether, benzoin n-butyl ether, and benzoin isobutyl ether. Examples of the benzophenone compound include benzophenone, methyl o-benzoylbenzoate, Michler's ketone, 4,4'-bisdiethylaminobenzophenone, 4,4'-dichlorobenzophenone. Examples of the thioxanthone compound include thioxanthone, 2-methylthioxanthone, 2-ethylthioxanthone, 2-isopropylthioxanthone, 4-isopropylthioxanthone, 2-chlorothioxanthone, and 2,4-diethylthioxanthone. Of those aromatic ketones serving as a light-sensitive radical polymerization initiator, more preferred are acetophenone compounds and benzyl compounds in point of their curing capability, storage stability and odorlessness. One or more such aromatic ketones may be used herein as a light-sensitive radical polymerization initiator, either singly or as combined depending on the desired performance of the initiator.

For the purpose of increasing the sensitivity thereof, a sensitizer may be added to the polymerization initiator. Examples of the sensitizer are n-butylamine, triethylamine, tri-n-butyl phosphine, and thioxanthone.

Plural types of the photopolymerization initiators may be combined and used herein, and the amount thereof is preferably from 0.01 to 20% by mass around of the solid content of the coating liquid, more preferably from 0.5 to 5% by mass around. For light irradiation for polymerization of the liquid-crystal compound, preferably used are UV rays.

The composition may comprise a polymerizable non-liquid crystal monomer(s) along with the polymerizable liquid crystal compound. Examples of the polymerizable monomer include compounds having a vinyl, vinyloxy, acryloyl or methacryloyl. For improving the durability, polyfunctional monomers, having two or more polymerizable groups, such as ethyleneoxide-modified trimethylolpropane acrylates maybe used.

The amount of the polymerizable non-liquid crystal monomer is preferably equal to or less than 15% by mass around and more preferably from 0 to 10% by mass around with respect to the amount of the liquid crystal compound.

The optically anisotropic layer may be prepared as follows. The composition is prepared as a coating liquid, and applied to a surface of an alignment layer disposed on the polymer film of the invention. After that, the composition is dried to remove solvent therefrom, thereby align liquid crystal molecules. Then, the alignment is fixed via polymerization, and an optically anisotropic layer is prepared. Examples of the alignment layer which can be used in the invention include polyvinyl alcohol films and polyimide films.

The coating method may be any known method of curtain-coating, dipping, spin-coating, printing, spraying, slot-coating, roll-coating, slide-coating, blade-coating, gravure-coating or wire bar-coating.

Drying the coating layer may be carried out under heat. During drying it, while solvent is removed from it, liquid crystal molecules therein are aligned in a preferred state.

Next, the layer is irradiated with UV light to carry out polymerization reaction, and then the alignment state is immobilized to form an optically anisotropic layer. The irradiation energy is preferably from 20 mJ/cm$^2$ to 50 J/cm$^2$, more preferably from 100 mJ/cm$^2$ to 800 mJ/cm$^2$. For promoting the optical polymerization, the light irradiation may be attained under heat.

The thickness of the optically anisotropic layer may be from 0.1 to 10 micro meters or from 0.5 to 5 micro meters.

3. Polarizing Plate:

The invention also relates to a polarizing plate comprising at least the polymer film of the invention or the retardation film of the invention, and a polarizing film. In incorporating the polarizing plate of the invention into a liquid-crystal display device, preferably, the polymer film or the retardation film of the invention is arranged on the liquid-crystal cell side. In an embodiment having the retardation film of the invention, preferably, the back (on which the optically anisotropic layer is not formed) of the polymer film of the invention serving as a support is stuck to the surface of the polarizing film. In any embodiment, preferably, the polymer film of the invention and the polarizing films are stuck in such a manner that the crossing angle between the in-plane slow axis of the polymer film and the transmission axis of the polarizing film is nearly 0 degree. The crossing angle needs not be strictly 0 degree, and an acceptable error of around ±5 degrees in production does not have any influence on the effect of the invention, but is acceptable here. Preferably, a protective film such as a cellulose acylate film or the like is stuck to the other surface of the polarizing film.

Figure 2:
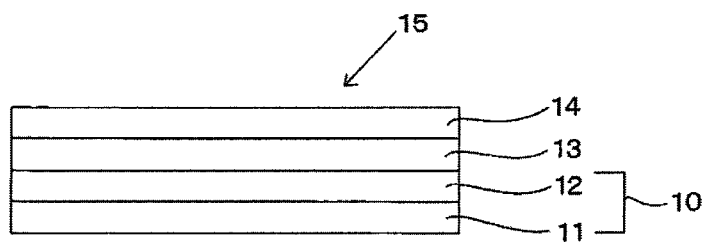
FIG. 2 is a schematic cross sectional view illustrating one embodiment of a polarizing plate of the present invention.

FIG. 2 shows a schematic cross-sectional view of one embodiment of the polarizing plate of the invention. The polarizing plate 15 shown in FIG. 2 comprises a polarizing film 13 and has, on the surfaces thereof, a retardation film 10 of the invention and a protective film 14 for protecting the polarizing film 13. The support 12 to constitute the retardation film 10 is the polymer film of the invention, and the back thereof, or that is, the side thereof on which the optically anisotropic layer 11 is not formed is stuck to the surface of the polarizing film 13. When the polarizing plate 15 is incorporated into a liquid-crystal display device, the retardation film 10 is arranged to face the liquid-crystal cell side. Though not shown, the polarizing plate 15 in FIG. 2 may have any other functional layer. For example, a diffusion layer, an antiglare layer and the like may be formed on the protective film 14.

The other members than the polymer film or the retardation film of the invention to constitute the polarizing plate of the invention are described below along with various materials usable for their production.

Polarizing Film

Examples of a polarizing film (polarizer) include an iodine-base polarizing film, a dye-base polarizing film with a dichroic dye, and a polyene-base polarizing film, and any of these is usable in the invention. The iodine-base polarizing film and the dye-base polarizing film are produced generally by the use of polyvinyl alcohol films.

Protective Film

As the protective film to be bonded to the other surface of the polarizing film, preferably used is a transparent polymer film. "Transparent" means that the film has a light transmittance of at least 80%. As the protective film, preferred are cellulose acylate films, and polyolefin films containing polyolefin(s). Of cellulose acylate films, preferred are cellulose triacetate film. Of polyolefin films, preferred are cyclic polyolefin-containing polynorbornene films.

The thickness of the protective film is preferably from 20 to 500 micro meters, or from 50 to 100 micro meters.

Light-Scattering Film

The polarizing plate of the invention may contain a light-scattering film disposed on one surface of the polarizing film. The light-scattering film may be a single layer film, or multilayered film. One example of the multilayered film is a light-scattering film containing a light transmissive film and a light-scattering layer disposed on thereon. The light-scattering film may contribute to improving the viewing angle characteristics when the viewing angle is inclines in the vertical and horizontal directions. In an embodiment where the anti-reflection layer is disposed outside the polarizing film disposed on the displaying side, the light-scattering film may exhibit an especially high effect. The light-scattering film (or the light scattering layer contained in the film) may be formed of a composition containing fine particles dispersed in a binder. The fine particles may be inorganic particles or organic particles. Preferably, the difference in the refractive index between the binder and the fine particles is from 0.02 to 0.20 or so. The light-scattering film (or the light scattering layer contained in the film) may additionally have a hard coat function. Regarding the light-scattering film usable in the invention, referred to are JPA No. hei 11-38208 where a front scattering coefficient is specifically defined; JPA No. 2000-199809 where the relative refractive index of transparent resin and fine particles is specifically defined to fall within a specific range; and JPA No. 2002-107512 where the haze value is defined to be at least 40%.

Production Method for Polarizing plate:

The polarizing plate of the invention may be produced as a long polarizing plate. For example, using the polymer film of the invention formed as a long film, an alignment film-forming coating liquid is optionally applied on its surface to form an alignment film thereon, and subsequently, an optically anisotropic layer-forming coating liquid is continuously applied thereto and dried to make the formed film have a desired alignment state, and thereafter this is irradiated with light to fix the alignment state to form an optically anisotropic layer, thereby producing a long retardation film of the invention. Subsequently, the retardation film may be once wound up into a roll. Separately, a long polarizing film and a long polymer film for protective film are individually wound up into a roll; and these are stuck in a mode of roll-to-roll operation to thereby produce a long polarizing plate. The long polarizing plate is, for example, transported and stored as a roll thereof; and when incorporated into a liquid-crystal display device, it is cut into a predetermined size. The polarizing plate of the invention needs not be a long product, and the production method described here is merely one example.

In producing the polymer film of the invention, when it is stretched in the machine direction, then it may be roll-to-roll worked to produce a polarizing plate; and the embodiment is favorable as simplifying the production process and as further enhancing the axial accuracy in sticking the film to a polarizing film.

4. Liquid-Crystal Display Device:

The polymer film, the retardation film and the polarizing plate of the invention are usable in various modes of liquid-crystal display devices. These are usable in any of transmission-type, reflection-type or semitransmission-type liquid-crystal display devices. The polymer film of the invention satisfies the above formulae (3) and (4) and is a colorless polymer film, and therefore does not bring about any unfavorable coloration caused by the polymer film, and contributes toward improving the viewing angle characteristics of liquid-crystal display devices.

In particular, the retardation film of the invention is effective in a liquid-crystal display device comprising a pair of substrates which are placed oppositely to each other and at least one of which has an electrode, and containing a nematic liquid-crystal material sandwiched between the pair of substrates, in which the liquid-crystal molecules of the nematic liquid-crystal material are aligned nearly vertically to the surface of the pair of substrates at the time of black level of display, especially a twist nematic (TN) mode liquid-crystal display device. In particular, the invention is effective in an embodiment of a transmission-type twist-nematic mode liquid-crystal display device.

In such a TN-mode liquid-crystal display device, preferably, two retardation films of the invention are arranged symmetrically to the liquid-crystal cell positioned at the center, and also preferably, the polarizing plates of the invention are arranged as upper and lower polarizing plates (on the viewers' side and on the backlight side) symmetrically to the liquid-crystal cell positioned at the center. The product of the thickness, d (micron), and the refractivity anisotropy, $\Delta n$, of the liquid-crystal layer of the TN-mode liquid-crystal cell, $\Delta n \cdot d$, is generally from 0.1 to 1.5 micro meters or so.

Figure 3:
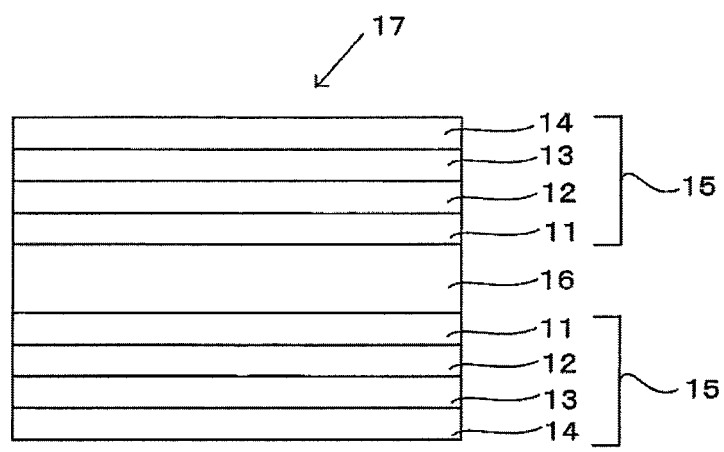
FIG. 3 is a schematic cross sectional view illustrating one embodiment of a liquid crystal display device of the present invention.

FIG. 3 shows a schematic cross-sectional view of a TN-mode liquid-crystal display device that is one embodiment of the liquid-crystal display device of the invention. The liquid-crystal display device shown in FIG. 3 comprises a TN-mode liquid-crystal cell 16, and two polarizing plates 15 of the invention as arranged symmetrically to sandwich the cell 16 therebetween. The liquid-crystal cell 16 has a liquid-crystal layer formed of a nematic liquid-crystal material; and the liquid-crystal layer is so designed that it is in a twisted alignment state under no driving voltage application thereto, and is in a vertical alignment state to the substrate surface under driving voltage application thereto. The upper and lower polarizing plates 15 are so arranged that the transmission axes of their polarizing films 13 are vertical to each other; and therefore, in no driving voltage application, the linearly polarized light coming in the liquid-crystal cell 16 from the backlight (not shown) arranged at the back of the lower polarizing plate 15 rotates by 90° along the twisted alignment of the liquid-crystal layer, and then passes through the transmission axis of the upper polarizing plate 15 to give the white state. On the other hand, in driving voltage application, the linearly polarized light coming in the liquid-crystal cell 16 directly passes through the cell 16 while keeping its polarization state, and therefore, this is blocked by the upper polarizing plate 15 to give the black state. The retardation films 10 arranged on and below the liquid-crystal cell 16 compensates for birefringence occurring in oblique directions at the time of black level of display.

Liquid-Crystal Display Device of Preferred Embodiment of the Invention:

Preferably, the liquid-crystal display device of the invention is a TN-mode liquid-crystal display device comprising a liquid-crystal cell and a polarizing plate arranged on at least one side of the liquid-crystal cell, in which the liquid-crystal cell includes red, green and blue color filters and liquid-crystal layers corresponding to the red, green and blue color filters, respectively, and the liquid-crystal layers have a multi-gap structure satisfying a relationship of dR≥dG>dB, or dR>dG≥dB, and the polarizing plate comprises a polarizing film and the optically compensatory film of the invention arranged on the liquid-crystal cell side of the polarizing film. Having the constitution, the liquid-crystal display device enjoys the advantageous effect of the invention mentioned above, and can prevent white color shift to occur in sideways directions. The embodiment of the liquid-crystal display device of the invention that comprises a liquid-crystal cell having such a multi-gap structure will be hereinunder referred to as "liquid-crystal display device of a preferred embodiment of the invention".

The liquid-crystal display device of the preferred embodiment of the invention preferably has polarizing plates arranged on both sides of the liquid-crystal cell therein, in which, more preferably, the polarizing plates arranged on both sides of the liquid-crystal cell each comprises the optically compensatory film of the invention and a protective layer.

In the liquid-crystal display device of the preferred embodiment of the invention, the liquid-crystal layer has a multi-gap structure, and therefore, depending on the thickness of the liquid-crystal layer corresponding to the individual color filters, retardation differs. As a whole of the liquid-crystal layer, the liquid-crystal layer could have a larger retardation at a longer wavelength, or that is, could have so-called reversed wavelength dispersion characteristics of retardation.

When the liquid-crystal layer having reversed wavelength dispersion characteristics of retardation is combined with the retardation film of the invention, then the light intensity to run on the viewing side of the liquid-crystal display device is constant irrespective of the wavelength; and therefore, the device enjoys the advantageous effect of the invention mentioned above, and can prevent white color shift to occur in sideways directions. The details of the constituent members of the liquid-crystal display device of the preferred embodiment of the invention are described below; however, the invention is not limited to the following specific embodiments.

The liquid-crystal cell includes red, green and blue color filters, and liquid-crystal layers corresponding to the red, green and blue color filters, respectively. Preferably, the liquid-crystal layer is sandwiched between the first substrate and the second substrate. Preferably, the color filter is formed on the first substrate. On the second substrate, preferably formed are a TFT element for controlling the electro-optical properties of liquid crystals, and a scanning line for giving a gate signal to the active element and a signal line for giving a source signal thereto.

In the liquid-crystal display device of the preferred embodiment of the invention, the color filter may be formed on any side of the first substrate or the second substrate.

The color filter for use in the liquid-crystal display device of the preferred embodiment of the invention may be any one having three primary color filters of red, green and blue filters. The color filter may further have any other color filter of a deep red filter. Preferably, the red filter has a maximum value of transmittance within a wavelength range of from 400 nm to 480 nm, the green filter has a maximum value of transmittance within a wavelength range of from 520 nm to 580 nm, and the blue filter has a maximum value of transmittance within a wavelength range of from 590 nm to 780 nm. The maximum value of transmittance of each color is preferably at least 80%.

The thickness of the color filter is suitably selected. Preferably, the thickness is from 0.4 to 4.0 micro meters, more preferably from 0.7 to 3.5 micro meters. As the pixel pattern of the color filter, employable is any pattern of stripes, mosaics, triangles, blocks, etc.

In the pixel part of the color filer, if desired, a black matrix may be arranged in the boundary between different color filters, or a protective layer may be arranged to cover the color filter, or a transparent conductive film may be arranged on the protective layer.

The color material to form the color filter is not specifically defined. For example, employable are dyes and pigments. Dye-based color filters are excellent in transparency and contrast and are characterized by having a lot of spectral variations. On the other hand, pigment-based color filters are excellent in heat resistance and lightfastness. For forming the color filters, for example, employable are a photolithography method, an etching method, a printing method, an electrodeposition method, an inkjet method, a vapor evaporation method, etc.

Preferably, the color material to form the color filter is pigment. The pigment-based color filter may be formed of a color resin prepared by dispersing pigment in a binder resin such as acrylic or polyimide resin. The pigment includes, for example, Color index Generic Name: Pigment Red 177 (crimson lake), Pigment Red 168, Pigment Green 7 (phthalocyanine green), Pigment Green 36, Pigment Blue 15 (phthalocyanine blue), Pigment Blue 6, Pigment Yellow 83 (azo yellow), etc. For color control, different color pigments may be mixed and combined for use herein.

Regarding the dispersion condition of the pigment, the mean particle size of the secondary particles of the pigment is preferably at most 0.2 micro meters, more preferably at most 0.1 micro meters. The secondary particles are aggregates of some fine pigment particles (primary particles. The pigment-based color filter having such a dispersion condition may have a high transmittance and have little negative influence on polarizability.

The liquid-crystal layers to be in the liquid-crystal display device of the preferred embodiment of the invention have a multi-gap structure satisfying a relationship of $dR \geq dG > dB$, or $dR > dG > dB$ in point of the thickness of the layer corresponding to each color filter. $dR$, $dG$ and $dB$ each mean the thickness of the liquid-crystal layer corresponding to the red, green and blue color filters, respectively. Most preferably, the thickness of the liquid-crystal layers corresponding to the respective color filters satisfies $dR > dG > dB$. However, in case where $dR = dG$ and $dG > dB$, the light leakage from the liquid-crystal display device in a blue region that may have some significant influence could be reduced, and therefore the device of the type could have relatively good display characteristics. In case where $dG = dB$ and $dR > dG$, similarly the device is relatively good.

$(dR-dG)$ and $(dG-dB)$ each are preferably from 0.1 to 1.5 micro meters, more preferably from 0.5 to 1.2 micro meters. Preferably, $dR$ is from 2.8 to 7.9 micro meters, $dG$ is from 2.7 to 5.7 micro meters, and $dB$ is from 2.6 to 5.6 micro meters.

Preferably in the liquid-crystal display device of the invention, $dR$ and $dB$ satisfy 0 micro meters $< dR-dB \leq 3.0$ Mm, as further reducing the white color shift in sideways directions.

More preferably, the multi-gap structure of the liquid-crystal layers satisfies 0.2 micro meters $\leq dR-dB \leq 3.0$ micro meters, even more preferably 1.0 micro meters $\leq dR-dB \leq 2.5$ micro meters.

Any suitable method is employable for forming the multi-gap structure. Preferably, the multi-gap structure is formed by changing the thickness of the red, green and blue color filters individually. Regarding the thickness of the color filters, preferably, blue of the three primary colors is the thickest, next green is thicker, and red is thinnest. The thickness of the color filters may be changed by increasing or decreasing the amount of the color resin to be coated in case where a photolithography method or an etching method is selected. In case where an electrodeposition method or a vapor evaporation method is selected, the dipping time in the electrodeposition liquid or the vapor evaporation time may be varied to thereby control the thickness of the color filters.

In another method, the multi-gap structure may be formed by providing an undercoat layer on the first substrate side of the individual color filters, and changing the thickness of the undercoat layer corresponding to the color of the color filter. In still another method, the multi-gap structure may be formed by providing an overcoat layer on the liquid-crystal layer side of the individual color filters, and changing the thickness of the overcoat layer corresponding to the color of the color filter. In this, the overcoat layer may serve also as the protective layer for the color filter.

The thickness of the individual color filters may be the same or may differ for different color. In this case, the multi-gap structure may be formed by suitably controlling the thickness of the undercoat layer or the overcoat layer. The liquid-crystal cell for use in the liquid-crystal display device of the preferred embodiment of the invention may have both the undercoat layer and the overcoat layer, or may have the undercoat layer and/or the overcoat layer only in some color filters of the red, green and blue color filters.

The material to form the undercoat layer and the overcoat layer is preferably one excellent in transparency and heat resistance. The material includes, for example, polyimide resins, and UV-curable resins such as acrylic resins and epoxy resins.

Regarding the wavelength dispersion characteristics of retardation of the liquid-crystal layer, preferably, the layer has reversed wavelength dispersion characteristics of retardation; and the liquid-crystal layer of the type is effective for reducing the light leakage in a blue region that has heretofore been a cause of display characteristics degradation.

5. Rth Inducing Agent

The present invention also relates to an Rth inducing agent containing at least either one species of the compound represented by the formula (I) and the compound represented by the formula (I'). Preferable examples of the compound represented by the formula (I) and the compound represented by the formula (I'), contained in the Rth inducing agent of the present invention, have been described in the above.

The Rth inducing agent of the present invention has a potent effect of inducing Rth, and can therefore induce Rth even with a small amount of addition.

6. Merocyanine Compound

The present invention also relates to a merocyanine compound represented by the formula (II), and a merocyanine compound represented by the formula (II'). Preferable examples of the compounds have been described in the above. The merocyanine compound of the present invention is used for various applications such as an additive (i.e., Rth inducing agent) for polymer film.

5. Measurement Method

The methods for measuring some properties such as optical properties are described in detail below.

(1) Re and Rth

In this description, Re(λ) and Rth(λ) are retardation (nm) in plane and retardation (nm) along the thickness direction, respectively, at a wavelength of λ. Re(λ) is measured by applying light having a wavelength of λ nm to a film in the normal direction of the film, using KOBRA 21ADH or WR (by Oji Scientific Instruments).

When a film to be analyzed is expressed by a monoaxial or biaxial index ellipsoid, Rth(λ) of the film is calculated as follows.

Rth (λ) is calculated by KOBRA 21ADH or WR based on six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the Rth(λ) of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to the following formulae (1) and (2): (1):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (1)$$

$$Rth = \left(\frac{nx+ny}{2} - nz\right) \times d \quad (2)$$

Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. On the basis of thus-calculated nx, ny and nz, $Nz=(nx-nz)/(nx-ny)$ is further calculated.

In the description, the measurement wavelength for Re or Rth is λ=550 nm in the visible light region, unless otherwise specifically noted. And in the description, the numerical data, the numerical range and the qualitative expression (for example, "equivalent", "same", etc.) indicating the optical characteristics should be so interpreted as to indicate the numerical data, the numerical range and the qualitative expression that include the error range generally acceptable for liquid-crystal display devices and their component parts.

(2) Substitution Degree

By measuring the binding level of acetic acid and/or a fatty acid with 3 to 22 carbon atoms in substitution with the hydroxyl groups in cellulose, the substitution degree can be calculated. The methods for the measurement are according to ASTM D-817-91.

EXAMPLES

The present invention will be explained to further detail, referring to Examples. Note that the materials, reagents, amounts and ratios of substances, operations and so forth explained in Examples below may appropriately be modified without departing from the spirit of the present invention. The scope of the present invention is, therefore, not limited to the specific examples described below.

Exemplary Synthesis 1: Synthesis of Compound 38

Compound 38 was synthesized according to the scheme below. Compound A was synthesized according to a method described for example in U.S. Pat. No. 3,950,160, and Compound B-38 was synthesized according to a method described for example in Synthetic Communications, 1997, 27, p. 2539-2546.

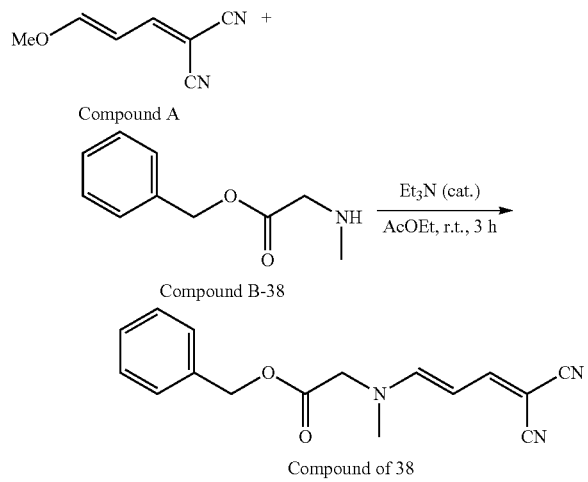

In a 100 mL recovery flask, 0.75 g (5.58 mmol) of Compound A, 1 g (5.58 mmol) of Compound B-38, 5 mL of ethyl acetate, and a catalytic amount of triethylamine were placed, and stirred at room temperature for 3 hours. The product was isolated and purified by silica gel column chromatography, to obtain 1.2 g of Compound 38 (yield: 76%).

The thus-synthesized Compound 38 was identified by $^1$H-NMR. Each of the Compounds has two isomers.

$^1$H-NMR (400 MHz, CDCl$_3$): δ: 3.05, 3.25 (s, 3H), 4.04, 4.07 (s, 2H), 5.24 (s, 2H), 5.5, 5.67 (t, 1H), 6.95, 7.05 (d, 1H), 7.23 (d, 1H), 7.37 (m, 5H).

Exemplary Synthesis 2: Synthesis of Compound 41

Compound 41 was synthesized similarly in accordance with that in Exemplary Synthesis 1. NMR spectral data of the thus-obtained Compound 41 is given below.

$^1$H-NMR (400 MHz, CDCl$_3$): δ: 0.9 (m, 3H), 1.2-1.5 (m, 18H), 1.6-1.7 (m, 2H), 3.05, 3.25 (s, 3H), 2.99, 3.05 (s, 2H), 4.2 (m, 2H), 5.5, 5.7 (t, 1H), 6.99, 7.08 (d, 1H), 7.25 (d, 1H).

Exemplary Synthesis 3: Synthesis of Compound 42

Compound 42 was synthesized similarly in accordance with that in Exemplary Synthesis 1. NMR spectral data of the thus-obtained Compound 42 is given below.

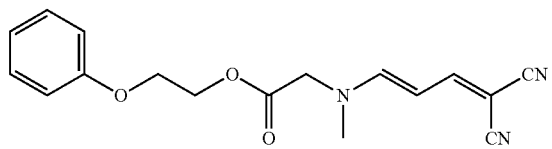

$^1$H-NMR (400 MHz, CDCl$_3$): δ: 3.15, 3.22 (s, 3H), 4.04, 4.07 (s, 2H), 4.2 (m, 2H), 4.55 (m, 2H), 5.5, 5.67 (t, 1H), 6.85-7.1 (m, 4H), 7.2-7.35 (m, 3H).

Exemplary Synthesis 4: Synthesis of Compound 43

Compound 43 was synthesized similarly in accordance with that in Exemplary Synthesis 1. NMR spectral data of the thus-obtained Compound 43 is given below.

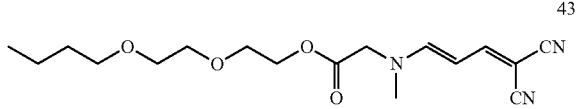

$^1$H-NMR (400 MHz, CDCl$_3$): δ: 0.91 (m, 3H), 1.35 (m, 2H), 1.6 (m, 2H), 3.05, 3.25 (s, 3H), 3.45-3.8 (m, 8H), 4.2 (m, 2H), 4.04, 4.07 (s, 2H), 4.05 (m, 2H), 5.5, 5.7 (t, 1H), 6.99, 7.05 (d, 1H), 7.25 (d, 1H).

Exemplary Synthesis 5: Synthesis of Compound 55

Compound 55 was synthesized similarly in accordance with that in Exemplary Synthesis 1. NMR spectral data of the thus-obtained Compound 55 is given below.

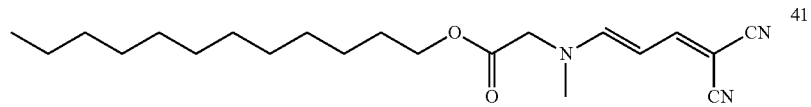 [SMILES: CCCCCCCCCCCCOC(=O)CN(C)/C=C/C=C(C#N)C#N]

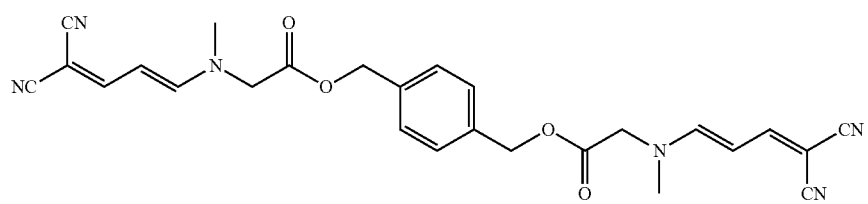

55

$^1$H-NMR (400 MHz, DMSO): δ: 3.03, 3.19 (s, 6H), 4.45 (s, 4H), 5.2 (s, 4H), 5.5 (t, 2H), 7.32, 7.4 (d, 4H), 7.6-7.8 (m, 4H).

Exemplary Synthesis 6: Synthesis of Compound 60

Compound 60 was synthesized similarly in accordance with that in Exemplary Synthesis 1. NMR spectral data of the thus-obtained Compound 60 is given below.

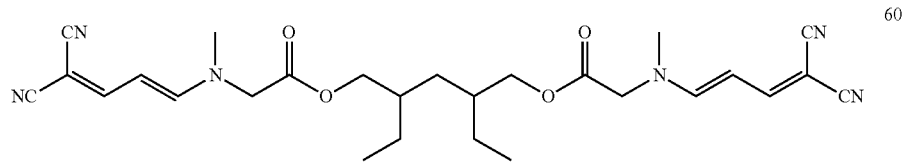 [SMILES: CCC(COC(=O)CN(C)/C=C/C=C(C#N)C#N)CC(CC)COC(=O)CN(C)/C=C/C=C(C#N)C#N]

60

$^1$H-NMR (400 MHz, CDCl$_3$): δ: 0.95 (m, 6H), 1.25-1.4 (m, 6H), 1.7 (m, 2H), 3.05, 3.25 (s, 6H), 4.0-4.15 (m, 8H), 5.35, 5.65 (t, 2H), 7.05 (m, 2H), 7.25 (d, 2H).

Exemplary Synthesis 7: Synthesis of Compound 68

Compound 68 was synthesized similarly in accordance with that in Exemplary Synthesis 1. NMR spectral data of the thus-obtained Compound 68 is given below. Exemplary

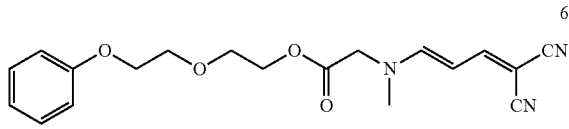

68

$^1$H-NMR (400 MHz, CDCl$_3$): δ3.00, 3.20 (s, 3H), 3.78-3.90 (m, 4H), 4.0-4.2 (m, 4H), 4.35-4.42 (m, 2H), 5.45, 5.65 (t, 1H), 6.85-7.35 (m, 7H).

Example 1: Synthesis of Polymer Film 1

(1-1) Preparation of Dope

Cellulose acetate solutions were prepared according to the compositional ratio listed below, using an oligomer, the composition and number-average molecular weight of which being given in Table further below.

| Composition of Cellulose Acetate Solution | |
|---|---|
| Cellulose triacetate (TAC, average degree of substitution = 2.86) | 100.0 parts by mass |
| Methylene chloride (first solvent) | 475.9 parts by mass |
| Methanol (second solvent) | 113.0 parts by mass |
| Butanol (third solvent) | 5.9 parts by mass |
| Silica particle (AEROSIL R972, from Nippon Aerosil Co. Ltd., average particle size = 16 nm) | 0.13 parts by mass |

-continued

| Composition of Cellulose Acetate Solution | |
|---|---|
| Compound 42 | 1.8 parts by mass |
| Oligomer (composition given in Table below) | 15 parts by mass |

The thus-prepared solution was cast through a casting die, onto a mirror-finished surface of a stainless steel support in a form of a 3 m-diameter drum, according to the PIT drawing condition listed in Table below, to form a web.

Next, upon confirming that the web on the support showed levels of the residual solvent content and film surface temperature listed in Table below, the web was stretched in the TD direction by a factor of stretching (%) listed in Table below. The stretching was implemented by holding both edges of the web with a pin tenter, so as to widen the web in the direction orthogonal to the machine direction.

Upon confirming that the web showed, after the stretching, the level of residual solvent content listed in Table below, the web was annealed while keeping the film surface temperature listed in Table 1 below. Annealing was proceeded while controlling the temperature of a drying zone with a dry air, with the pin tenter fixed.

Compositional ratios of the additives and manufacturing conditions of the polymer film 1 are listed in Table below.

TABLE 1

| Formulation | Merocyanine-based compound | Compound 42 (parts by mass) | | 1.8 |
|---|---|---|---|---|
| | Oligomer composition | Dicarboxylic acid unit*$^1$ | TPA | 50 |
| | | | PA | 0 |
| | | | AA | 50 |
| | | | SA | 0 |
| | | Diol unit*$^2$ | EG | 50 |
| | | | PG | 50 |
| | | Molecular weight*$^3$ | | 1000 |
| | | Amount of addition (parts by mass) | | 15 |
| Process | Stretching | PIT drawing (%) | | 104 |
| | | Film surface temperature (° C.) | | 40 |
| | | Factor of stretching in TD (%) | | 10 |

TABLE 1-continued

| | Annealing | Residual solvent content (%) | 50 |
| | | Film surface temperature (° C.) | 80 |

*[1]TPA = terephthalic acid, PA = phthalic acid, AA = adipic acid, SA = succinic acid, with the individual molar ratios given in Table 1.
*[2]EG = ethanediol, PG = 1,3-propanediol, with the individual molar ratios given in Table 1.
*[3]Number-average molecular weight The polymer film 1 was found to have a Rth of 100 nm.

Example 2 to 10: Manufacturing of Polymer Films 2 to 10

Polymer films 2 to 10 were manufactured similarly as described in Example 1, except that Compound 42 was replaced respectively with the Compounds listed in Table 2 below. Amounts of addition of the additives were changed so as to adjust the Rth of each of the resultant polymer films to 100 nm.

Comparative Example 1: Manufacturing of Polymer Film 11

Polymer film 11 was manufactured similarly as described in Example 1, except that Compound 42 was replaced with Comparative Compound 1 below. Amounts of addition of the additives were changed so as to adjust the Rth of the resultant polymer films to 100 nm.

Comparative Compound 1

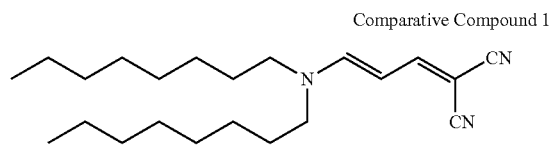 [SMILES: CCCCCCCCN(/C=C/C=C(C#N)C#N)CCCCCCCC]

Comparative Example 2: Manufacturing of Polymer Film 12

Polymer film 11 was manufactured similarly as described in Example 1, except that Compound 42 was replaced with Comparative Compound 2 below. Amounts of addition of the additives were changed so as to adjust the Rth of the resultant polymer films to 100 nm.

Comparative Compound 2

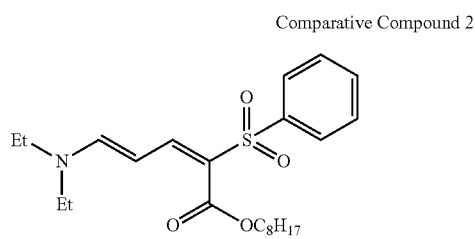

[Evaluation]
1. Expression of Rth

Performance of inducing Rth of the additive used for manufacturing the individual polymer films was evaluated, based on the amount of addition of additive required for achieving an Rth value of 100 nm. The smaller the amount of addition is, the merocyanine compound used herein as the additive is understood to have stronger performance of inducing Rth in the polymer film.

2. Wavelength Dispersion Characteristics

Wavelength dispersion characteristics of Rth of the individual transparent polymer films obtained in the above were evaluated, using values of Rth(450)/Rth(630) according to the criteria below:
○: Rth(450)/Rth(630)≥1.8
Δ: 1.8>Rth(450)/Rth(630)≥1.5
×: 1.5>Rth(450)/Rth(630)

3. Volatility

TG-DTA of each Compound was measured, and weight loss after heated at 140° C. for 20 to 80 minutes was evaluated according to the criteria below:
○: <10%
×: ≥10%

TABLE 2

| | | Exam. 1 | Exam. 2 | Exam. 3 | Exam. 4 | Exam. 5 | Exam. 6 | Exam. 7 | Exam. 8 | Exam. 9 | Exam. 10 | Comp. Exam. 1 | Comp. Exam. 2 |
|---|---|---|---|---|---|---|---|---|---|---|---|---|---|
| Polymer (parts by mass) | Cellulose triacetate (TAC) | 100 | 100 | 100 | 100 | 100 | 100 | 100 | 100 | 100 | 100 | 100 | 100 |
| Additive (parts by mass) | Oligomer | 15 | 15 | 15 | 15 | 15 | 15 | 15 | 15 | 15 | 15 | 15 | 15 |
| Additive (parts by mass) | Compound 42 | 1.8 | — | — | — | — | — | — | — | — | — | — | — |
| | Compound 14 | — | 1.8 | — | — | — | — | — | — | — | — | — | — |
| | Compound 41 | — | — | 1.8 | — | — | — | — | — | — | — | — | — |
| | Compound 38 | — | — | — | 1.8 | — | — | — | — | — | — | — | — |
| | Compound 43 | — | — | — | — | 1.8 | — | — | — | — | — | — | — |
| | Compound 55 | — | — | — | — | — | 1.8 | — | — | — | — | — | — |
| | Compound 60 | — | — | — | — | — | — | 1.8 | — | — | — | — | — |
| | Compound 61 | — | — | — | — | — | — | — | 1.8 | — | — | — | — |
| | Compound 63 | — | — | — | — | — | — | — | — | 1.8 | — | — | — |
| | Compound 68 | — | — | — | — | — | — | — | — | — | 1.8 | — | — |
| | Comparative Compound 1 | — | — | — | — | — | — | — | — | — | — | 6.5 | — |
| | Comparative Compound 2 | — | — | — | — | — | — | — | — | — | — | — | 3.6 |
| Evaluation | Expression of Rth (wt %) | 1.36 | 2.18 | 2.18 | 1.36 | 1.64 | 1.36 | 1.64 | 1.54 | 2.46 | 1.4 | 7.86 | 4.37 |
| | Dispersibility | ○ | ○ | ○ | ○ | ○ | ○ | ○ | ○ | ○ | ○ | ○ | ○ |
| | Volatility | ○ | ○ | ○ | ○ | ○ | ○ | ○ | ○ | ○ | ○ | × | ○ |

It is known form Table 2 that the polymer films of Examples 1 to 10 need only very small amounts of addition of the merocyanine-based additives, when compared with Comparative Examples 1 to 2 while fixing the value of Rth constant at 100 nm. It is therefore understood that the compound represented by the formula (I) and the compound represented by the formula (I') are excellent in the performance of inducing Rth. It is also understood that all of the polymer films of Examples 1 to 10 showed normal wavelength dispersion characteristics of Rth, and are therefore useful as optical films (i.e., optically compensatory film) for composing liquid crystal display devices.

It is also judged, from low volatility, that the polymer films of Examples 1 to 10 exhibit high affinity to the polymer (TAC).

Example 11: Manufacturing of Liquid Crystal Display Device

(1) Manufacturing of Phase Difference Film

(1-1) Formation of Alignment Film

On the saponified surface of the polymer film of Example 1, a coating liquid for forming an alignment film, having the composition below, was coated using a #14 wire bar coater to an amount of 24 mL/m², and the coated film was dried under hot air blown at 100° C. for 120 seconds. Thickness of the alignment film was found to be 0.6 μm. Next, the longitudinal direction (machine direction) of the film was aligned to 0°, and the thus-formed alignment film was rubbed using a 2000 mm-wide rubbing roller, at a number of rotation of rubbing roller of 400 rpm in the 0° direction. Travel speed herein was adjusted to 40 m/min. The rubbed surface was then cleaned by ultrasonic dust removal.

| Composition of Coating Liquid for Forming Alignment Film | |
|---|---|
| Modified polyvinylalcohol shown below | 23.4 parts by mass |
| Water | 732.0 parts by mass |
| Methanol | 166.3 parts by mass |
| Isopropanol | 77.7 parts by mass |
| IRGACURE 2959 (from BASF) | 0.6 parts by mass |

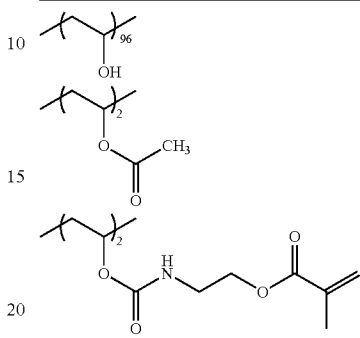

(1-2) Formation of Optically Anisotropic Layer

On the rubbed surface of the alignment film after the dust removal, a coating liquid for forming optically anisotropic layer, having the composition listed below, was coated using a #2.6 wire bar coater. The coated film was then heated in a 70° C. drying zone for 90 seconds, to thereby align the discotic liquid crystal compound. The film was then irradiated with ultraviolet radiation with a luminance of 500 mW/cm² for 4 seconds, using a UV irradiation apparatus (UV lamp: output=160 W/cm, emission length=1.6 m), while keeping the film surface temperature at 100° C., so as to allow a crosslinking reaction to proceed, to thereby fix the alignment of a liquid crystal compound contained therein. The film was allowed to cool to room temperature, then taken up on a cylinder, to give a rolled phase difference film (optically compensatory film).

| Composition of Coating Liquid for Forming Optically Anisotropic Layer | |
|---|---|
| Methyl ethyl ketone | 345.0 parts by mass |
| Liquid crystalline compound shown below | 100.0 parts by mass |
| Alignment controlling agent 1 having structure below | 0.8 parts by mass |
| Alignment controlling agent 2 having structure below | 1.0 part by mass |
| IRGACURE 907 (from BASF) | 1.5 parts by mass |
| KAYAKURE DETX (from Nippon Kayaku Co. Ltd.) | 0.5 parts by mass |

(Liquid crystalline compound)

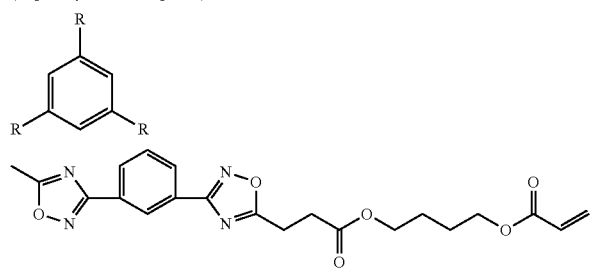

(Alignment controlling agent 1)

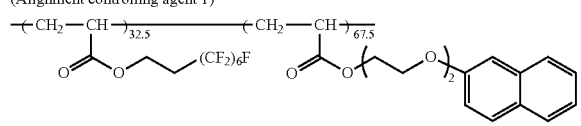

Composition of Coating Liquid for Forming Optically Anisotropic Layer (Alignment controlling agent 2)

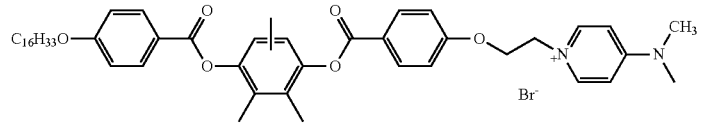

(2) Manufacturing of Polarizing Plate

A polyvinyl alcohol (PVA) film of 80 μm thick was dipped in a 0.05% by mass aqueous solution of iodine at 30° C. for 60 seconds for dying, then dipped in a 4% by mass aqueous solution of boric acid for 60 seconds during which the film is stretched five times as long as the original length, and dried at 50° C. for 4 minutes, to thereby obtain a polarizing film of 20 μm thick.

The phase difference film manufactured as described previously was dipped into a 1.5 mol/L aqueous solution of sodium hydroxide at 55° C., and then thoroughly washed with water to remove sodium hydroxide. The phase difference film was then dipped into a 0.005 mol/L aqueous solution of sulfuric acid at 35° C. for one minute, and then thoroughly washed by dipping it into water so as to thoroughly remove sulfuric acid. Lastly, the thus-obtained sample was thoroughly dried at 120° C.

The phase difference film saponified as described in the above, and a commercially obtained cellulose acetate film which was similarly saponified were bonded using a polyvinyl alcohol-based adhesive, while placing the above-described polarizing film in between, to thereby obtain a polarizing plate. The phase difference film herein was bonded so as to dispose the optically anisotropic layer outermost. The commercially obtained cellulose acetate film was Fujitac TD80 (from FUJIFILM Corporation). Since the polarizing film and the protective films to be bonded on both faces of the polarizing film are provided in a rolled form, so that they were continuously bonded while aligning their longitudinal directions in parallel with each other. As a consequence, the longitudinal direction of the roll (direction of casting of the cellulose acylate stacked film) and the absorption axis of the polarizing films were aligned in parallel.

(3) Manufacturing of TN-Mode Liquid Crystal Display Device

A pair of polarizing plates were removed from a liquid crystal display device (AL2216W, from Acer Inc.) having a TN-Mode Liquid-Crystal Cell, and instead the polarizing plates manufactured in the above were bonded one by one on the viewer's side and on the back light side, using a pressure sensitive adhesive, while disposing the phase difference film on the Liquid-Crystal Cell side, that is, while disposing the optically anisotropic layer closest to the Liquid-Crystal Cell. Two polarizing plates were disposed so as to align the transmission axis of the polarizing plate on the viewer's side and the transmission axis of the polarizing plate on the backlight side orthogonal to each other.

Example 12 to 20: Manufacturing of Liquid Crystal Display Device

Liquid crystal display devices were manufactured similarly as described in Example 11, except that the polymer films 2 to 10 were respectively used in place of the polymer film 1.

Evaluation revealed that the liquid crystal display devices of Examples 11 to 20 were excellent in the viewing angle characteristics, contrast ratio and so forth, and exhibited well-balanced display characteristics.

The present disclosure relates to the subject matter contained in Japanese Patent Application No. 139125/2011 filed on Jun. 23, 2011, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A polarizing plate comprising a polymer film comprising at least one compound represented by formula (I) and formula (I'):

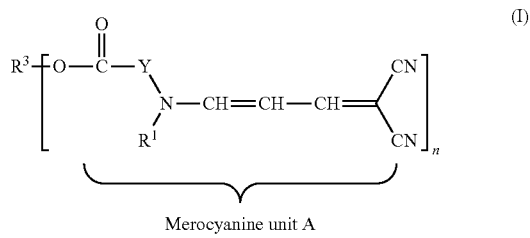

Merocyanine unit A

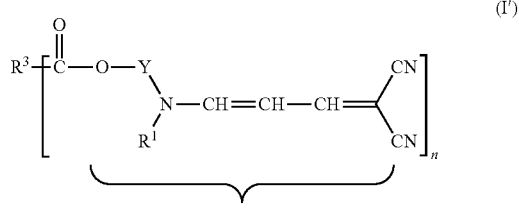

Merocyanine unit A in the formulae (I) and (I'), $R^1$ represents a $C_{1-6}$ unsubstituted alkyl group or $C_{6-12}$ unsubstituted aryl group; Y represents a $C_{1-6}$ substituted or unsubstituted alkylene group, or substituted or unsubstituted arylene group, where, given that Y represents a substituted or unsubstituted alkylene group, and optionally, one carbon atom, or two or more non-adjacent carbon atoms in the alkylene group may be substituted by oxygen atom(s); n represents an integer of 1 to 3, and for n=1, $R^3$ represents a substituted or unsubstituted alkyl group, or a substituted or unsubstituted aryl group, and optionally, one carbon atom, or two or more non-adjacent carbon atoms in the substituted or unsubstituted alkyl group may be substituted by oxygen atom(s), and for n=2 to 3, $R^3$ represents an n-valent linking group composed of one or more atoms; and for n=2 or larger, n merocyanine units A may be same or different.

2. A liquid crystal display device comprising a polymer film comprising at least one compound represented by formula (I) and formula (I'):

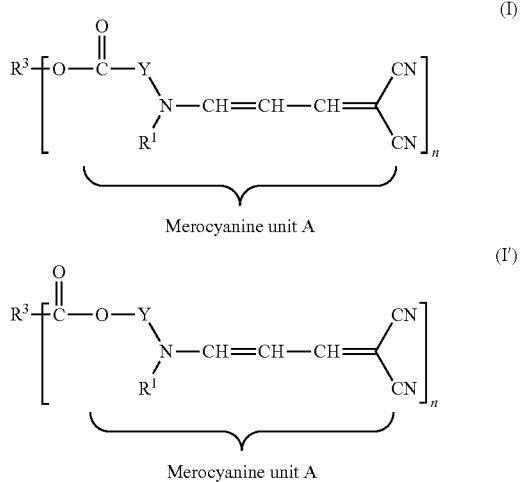

in the formulae (I) and (I'), $R^1$ represents a $C_{1-6}$ unsubstituted alkyl group or $C_{6-12}$ unsubstituted aryl group; Y represents a $C_{1-6}$ substituted or unsubstituted alkylene group, or substituted or unsubstituted arylene group, where, given that Y represents a substituted or unsubstituted alkylene group, and optionally, one carbon atom, or two or more non-adjacent carbon atoms in the alkylene group may be substituted by oxygen atom(s); n represents an integer of 1 to 3, and for n=1, $R^3$ represents a substituted or unsubstituted alkyl group, or a substituted or unsubstituted aryl group, and optionally, one carbon atom, or two or more non-adjacent carbon atoms in the substituted or unsubstituted alkyl group may be substituted by oxygen atom(s), and for n=2 to 3, $R^3$ represents an n-valent linking group composed of one or more atoms; and for n=2 or larger, n merocyanine units A may be same or different.

3. The polymer film according to claim 1, wherein the compound represented by the formula (I) is a compound represented by the formula (II) below:

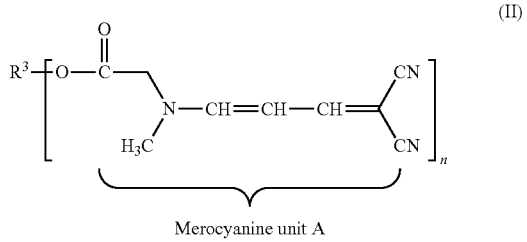

where, definitions of $R^3$ and n in the formula (II) are same as those in the formula (I).

4. The polymer film according to claim 1, wherein the compound represented by the formula (I') is a compound represented by the formula (II') below:

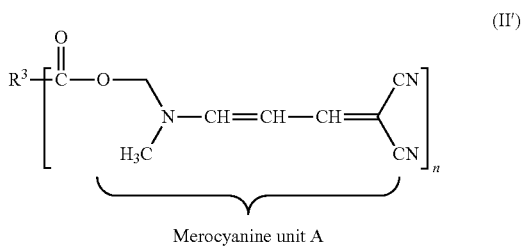

where, definitions of $R^3$ and n in the formula (II') are same as those in the formula (I').

5. The polymer film according to claim 1, configured as (i) or (ii) below:
  (i) n=1, and $R^3$ represents a substituted or unsubstituted alkyl group (where, optionally, one carbon atom, or two or more non-adjacent carbon atoms in the alkyl group may be substituted by oxygen atom(s)); or
  (ii) n=2 to 3, and $R^3$ represents a linking group composed of a substituted or unsubstituted alkylene group (where, optionally, one carbon atom, or two or more non-adjacent carbon atoms in the alkylene group may be substituted by oxygen atom(s)), substituted or unsubstituted arylene group, or a combination of them.

6. The polymer film according to claim 3, configured as (i) or (ii) below:
  (i) n=1, and $R^3$ represents a substituted or unsubstituted alkyl group (where, optionally, one carbon atom, or two or more non-adjacent carbon atoms in the alkyl group may be substituted by oxygen atom(s)); or
  (ii) n=2 to 3, and $R^3$ represents a linking group composed of a substituted or unsubstituted alkylene group (where, optionally, one carbon atom, or two or more non-adjacent carbon atoms in the alkylene group may be substituted by oxygen atom(s)), substituted or unsubstituted arylene group, or a combination of them.

7. The polymer film according to claim 4, configured as (i) or (ii) below:
  (i) n=1, and $R^3$ represents a substituted or unsubstituted alkyl group (where, optionally, one carbon atom, or two or more non-adjacent carbon atoms in the alkyl group may be substituted by oxygen atom(s)); or
  (ii) n=2 to 3, and $R^3$ represents a linking group composed of a substituted or unsubstituted alkylene group (where, optionally, one carbon atom, or two or more non-adjacent carbon atoms in the alkylene group may be substituted by oxygen atom(s)), substituted or unsubstituted arylene group, or a combination of them.

8. The polymer film according to claim 1, which comprises a polymer selected from cellulose-based polymer, polycarbonate-based polymer, polyester-based polymer, acrylic polymer, and styrene-based polymer as the main ingredient.

9. The polymer film according to claim 3, which comprises a polymer selected from cellulose-based polymer, polycarbonate-based polymer, polyester-based polymer, acrylic polymer, and styrene-based polymer as the main ingredient.

10. The polymer film according to claim 4, which comprises a polymer selected from cellulose-based polymer, polycarbonate-based polymer, polyester-based polymer, acrylic polymer, and styrene-based polymer as the main ingredient.

11. The polymer film according to claim 5, which comprises a polymer selected from cellulose-based polymer, polycarbonate-based polymer, polyester-based polymer, acrylic polymer, and styrene-based polymer as the main ingredient.

12. The polymer film according to claim 8, wherein the amount of addition of the compound represented by the formula (I) and/or the compound represented by the formula (I') is 0.3 to 10 parts by mass relative to the polymer.

13. The polymer film according to claim 9, wherein the amount of addition of the compound represented by the formula (I) and/or the compound represented by the formula (I') is 0.3 to 10 parts by mass relative to the polymer.

14. The polymer film according to claim 10, wherein the amount of addition of the compound represented by the formula (I) and/or the compound represented by the formula (I') is 0.3 to 10 parts by mass relative to the polymer.

15. The polymer film according to claim 11, wherein the amount of addition of the compound represented by the formula (I) and/or the compound represented by the formula (I') is 0.3 to 10 parts by mass relative to the polymer.

\* \* \* \* \*